US009049065B2

(12) United States Patent
Barriac et al.

(10) Patent No.: US 9,049,065 B2
(45) Date of Patent: Jun. 2, 2015

(54) REMOVAL OF ICI/ISI ERRORS IN FREQUENCY DOMAIN CHANNEL ESTIMATION FOR WIRELESS REPEATERS

(75) Inventors: Gwendolyn Denise Barriac, Encinitas, CA (US); Steven J. Howard, Ashland, MA (US); Dhananjay Ashok Gore, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 572 days.

(21) Appl. No.: 12/776,998

(22) Filed: May 10, 2010

(65) Prior Publication Data

US 2011/0116392 A1   May 19, 2011

Related U.S. Application Data

(60) Provisional application No. 61/177,198, filed on May 11, 2009.

(51) Int. Cl.
*H04W 24/00* (2009.01)
*H04L 25/02* (2006.01)
*H04B 7/155* (2006.01)

(52) U.S. Cl.
CPC ........ *H04L 25/0226* (2013.01); *H04B 7/15585* (2013.01); *H04L 25/022* (2013.01); *H04L 25/0242* (2013.01)

(58) Field of Classification Search
CPC .............. H04L 25/0242; H04L 25/022; H04L 25/0226; H04B 7/15585
USPC .......... 370/310, 315, 241, 252; 455/7, 9, 11.1
See application file for complete search history.

(56) References Cited

U.S. PATENT DOCUMENTS

| 6,795,264 B2 | 9/2004 | Wilson |
| 6,868,276 B2 * | 3/2005 | Nissila .......................... 455/504 |
| 6,915,477 B2 * | 7/2005 | Gollamudi et al. ........... 714/774 |
| 7,085,314 B2 | 8/2006 | Zhu et al. |

(Continued)

FOREIGN PATENT DOCUMENTS

| CN | 1901383 | 1/2007 |
| CN | 101076007 A | 11/2007 |

(Continued)

OTHER PUBLICATIONS

International Search Report and Written Opinion—PCT/US2010/034419, International Search Authority—European Patent Office—Feb. 15, 2011.

(Continued)

*Primary Examiner* — Chi H Pham
*Assistant Examiner* — Robert Lopata
(74) *Attorney, Agent, or Firm* — Linda Gunderson; Thomas A. Jolly

(57) ABSTRACT

A method for estimating a feedback channel for a wireless repeater using frequency domain channel estimation estimates an error correction term using a most recent channel estimate and cancels the error correction term from a current block of the receive signal. Then, the feedback channel is estimated using frequency domain channel estimation and using a current block of the pilot signal and the corrected block of the receive signal. A channel estimate error term may also be estimated and subtracted directly from the channel estimate.

23 Claims, 10 Drawing Sheets

(56) References Cited

U.S. PATENT DOCUMENTS

| | | |
|---|---|---|
| 7,215,927 B2 | 5/2007 | Miyoshi |
| 7,236,538 B1 * | 6/2007 | Banister ............... 375/267 |
| 7,349,505 B2 | 3/2008 | Blount et al. |
| 7,376,192 B2 * | 5/2008 | Koorapaty et al. ......... 375/259 |
| 7,406,140 B2 | 7/2008 | Kunieda et al. |
| 7,421,041 B2 * | 9/2008 | Khandekar et al. ......... 375/316 |
| 7,593,689 B2 | 9/2009 | Allen et al. |
| 7,596,352 B2 * | 9/2009 | Ding et al. ............... 455/11.1 |
| 7,627,287 B2 | 12/2009 | Moss |
| 7,715,785 B2 | 5/2010 | Braithwaite |
| 7,778,607 B2 * | 8/2010 | Withers et al. ............. 455/67.11 |
| 7,826,541 B2 | 11/2010 | Fujii et al. |
| 7,894,768 B2 * | 2/2011 | Ding et al. ............... 455/11.1 |
| 7,911,985 B2 | 3/2011 | Proctor, Jr. et al. |
| 8,068,783 B2 | 11/2011 | Braithwaite et al. |
| 8,081,945 B2 | 12/2011 | Crilly, Jr. et al. |
| 8,135,339 B2 | 3/2012 | Ranson et al. |
| 8,170,470 B2 * | 5/2012 | Park et al. ............... 455/7 |
| 8,228,878 B2 | 7/2012 | Larsson et al. |
| 8,233,426 B2 * | 7/2012 | Han et al. ............... 370/318 |
| 2002/0136189 A1 | 9/2002 | Sato |
| 2002/0167913 A1 | 11/2002 | Leung |
| 2003/0078025 A1 | 4/2003 | Smee et al. |
| 2004/0095992 A1 | 5/2004 | Balaberda |
| 2005/0157801 A1 | 7/2005 | Gore et al. |
| 2006/0030262 A1 | 2/2006 | Anderson et al. |
| 2006/0039460 A1 | 2/2006 | Fimoff et al. |
| 2006/0205342 A1 | 9/2006 | McKay et al. |
| 2006/0227887 A1 | 10/2006 | Li et al. |
| 2006/0239385 A1 | 10/2006 | Hofmeister |
| 2007/0033015 A1 | 2/2007 | Taira et al. |
| 2007/0036239 A1 | 2/2007 | Ma et al. |
| 2008/0130771 A1 | 6/2008 | Fechtel et al. |
| 2009/0034437 A1 | 2/2009 | Shin et al. |
| 2009/0149152 A1 | 6/2009 | Porco et al. |
| 2009/0225687 A1 * | 9/2009 | Hart et al. ............... 370/280 |
| 2010/0118922 A1 | 5/2010 | Ahn |
| 2010/0210205 A1 | 8/2010 | Park et al. |
| 2010/0222051 A1 * | 9/2010 | Watanabe et al. ......... 455/422.1 |
| 2010/0284280 A1 | 11/2010 | Gore et al. |
| 2010/0284447 A1 | 11/2010 | Gore et al. |
| 2011/0116531 A1 | 5/2011 | Gore et al. |
| 2012/0170620 A1 | 7/2012 | Ranson et al. |

FOREIGN PATENT DOCUMENTS

| | | | |
|---|---|---|---|
| EP | 0772310 A2 | 5/1997 | |
| GB | 2306082 A | 4/1997 | |
| JP | 2206930 A | 8/1990 | |
| JP | 5315983 A | 11/1993 | |
| JP | 2002290295 A | 10/2002 | |
| JP | 2006246447 A | 9/2006 | |
| JP | 2007028291 A | 2/2007 | |
| JP | 2009505511 A | 2/2009 | |
| TW | I288543 B | 10/2007 | |
| WO | WO2005112378 | 11/2005 | |
| WO | 2007022001 A2 | 2/2007 | |
| WO | WO2009014281 | * 11/2007 | ........... H04B 7/14 |
| WO | WO2009009542 A2 | 1/2009 | |
| WO | WO2009031746 A1 | 3/2009 | |

OTHER PUBLICATIONS

Lee, M., et al. "An Interference Cancellation Scheme for Mobile Communication Radio Repeaters", IEICE Transactions on Communications, Communications Society, Tokyo, JP, vol. E92-B, No. 5, May 1, 2009, pp. 1778-1785, XP001547676.

* cited by examiner

REMOVAL OF ICI/ISI ERRORS IN FREQUENCY DOMAIN CHANNEL ESTIMATION FOR WIRELESS REPEATERS

CROSS-REFERENCE TO RELATED APPLICATIONS

This application claims the benefit of U.S. Provisional Patent Application Ser. No. 61/177,198, filed on May 11, 2009, which application is incorporated herein by reference in its entirety.

This application is related to the following concurrently filed and commonly assigned U.S. patent applications: application Ser. No. 12/776,786, entitled "Removal of Multiplicative Errors in Frequency Domain Channel Estimation For Wireless Repeaters", filed May 11, 2009; application Ser. No. 12/776,867 and now U.S. Pat. No. 8,611,227, entitled "Frequency Domain Feedback Channel Estimation for an Interference Cancellation Repeater Including Sampling of Non Causal Taps", filed May 11, 2009; and application Ser. No. 12/776,957, entitled "Channel Estimate Pruning in Presence of Large Signal Dynamics in an Interference Cancellation Repeater", filed May 11, 2014. The applications are incorporated herein by reference in their entireties.

BACKGROUND

1. Field

This disclosure generally relates to repeaters in wireless communication systems.

2. Background

Wireless communication systems and techniques have become an important part of the way we communicate. However, providing coverage can be a significant challenge to wireless service providers. One way to extend coverage is to deploy repeaters.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

According to one embodiment of the present invention, a method for estimating a feedback channel for a wireless repeater in a wireless communication system where the wireless repeater has a first antenna and a second antenna to receive a receive signal and transmit an amplified signal and the receive signal is a sum of a remote signal to be repeated and a feedback signal resulting from the feedback channel between the first and second antenna of the wireless repeater includes (a) using blocks of N samples of the amplified signal as a pilot signal, (b) using blocks of N samples of the receive signal, (c) estimating an error correction term using a most recent channel estimate, (d) canceling the error correction term from a current block of the receive signal, and (e) estimating the feedback channel between the first antenna and the second antenna using frequency domain channel estimation and using a current block of the pilot signal and the corrected block of the receive signal, the channel estimate obtained becoming the most recent channel estimate.

According to another aspect of the present invention, a machine-readable medium comprising instructions, which, when executed by a machine, cause the machine to perform operations, the instructions include (a) using blocks of N samples of the amplified signal as a pilot signal, (b) using blocks of N samples of the receive signal, (c) estimating an error correction term using a most recent channel estimate, (d) canceling the error correction term from a current block of the receive signal, and (e) estimating the feedback channel between the first antenna and the second antenna using frequency domain channel estimation and using a current block of the pilot signal and the corrected block of the receive signal, the channel estimate obtained becoming the most recent channel estimate.

According to yet another aspect of the present invention, a computer-readable medium including program code stored thereon including program code to use blocks of N samples of the amplified signal as a pilot signal, program code to use blocks of N samples of the receive signal, program code to estimate an error correction term using a most recent channel estimate, program code to cancel the error correction term from a current block of the receive signal, and program code to estimate the feedback channel between the first antenna and the second antenna using frequency domain channel estimation and using a current block of the pilot signal and the corrected block of the receive signal, the channel estimate obtained becoming the most recent channel estimate.

According to another aspect of the present invention, a wireless repeater having a first antenna and a second antenna to receive a receive signal and transmit an amplified signal where the receive signal is a sum of a remote signal to be repeated and a feedback signal resulting from a feedback channel between the first antenna and the second antenna includes a channel estimation module configured to estimate an error correction term using a most recent channel estimate and a current block of N samples of the pilot signal, to cancel the error correction term from a current block of N samples of the receive signal, and to estimate the feedback channel between the first antenna and the second antenna using frequency domain channel estimation and using the current block of the pilot signal and the corrected block of the receive signal, the channel estimate obtained becoming the most recent channel estimate.

DETAILED DESCRIPTION

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may be more difficult to obtain the desired isolation between the repeater's antennas. Moreover, in some traditional repeater implementations, the target is to achieve as high a gain as reasonable while maintaining a stable feedback loop (loop gain less than unity). However, increasing the repeater gain renders isolation more difficult due to the increased signal leaking back into the donor antenna. In general, loop stability demands require that the signal leaking back into the donor antenna from the coverage antenna be much lower than the remote signal (the signal to be repeated), whether due to spatial isolation or other techniques such as digital cancellation. The maximum achievable signal to interference/noise ratio (SINR) at the output of the repeater is then the same as the SINR of the remote signal at the input to the repeater. High gain and improved isolation form two demands required for modern day repeaters, especially those for indoor applications.

Systems and techniques herein provide for wireless repeaters with improved isolation between the repeaters' donor antenna ("the receiving antenna" for the example of a forward link transmission) and the coverage antenna ("the transmitting antenna" for forward link transmissions). Furthermore, in some embodiments, systems and techniques herein provide for a unique repeater design employing interference cancellation or echo cancellation to significantly improve the isolation. In some embodiments, the interference cancellation and echo cancellation are realized using improved channel estimation techniques provided herein for accurate estimation of the channel. Effective echo cancellation requires very accurate channel estimation of the leakage channel. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to cancellation of an estimated leakage signal, which provides for partial or complete cancellation of the actual leakage signal.

Figure 1:
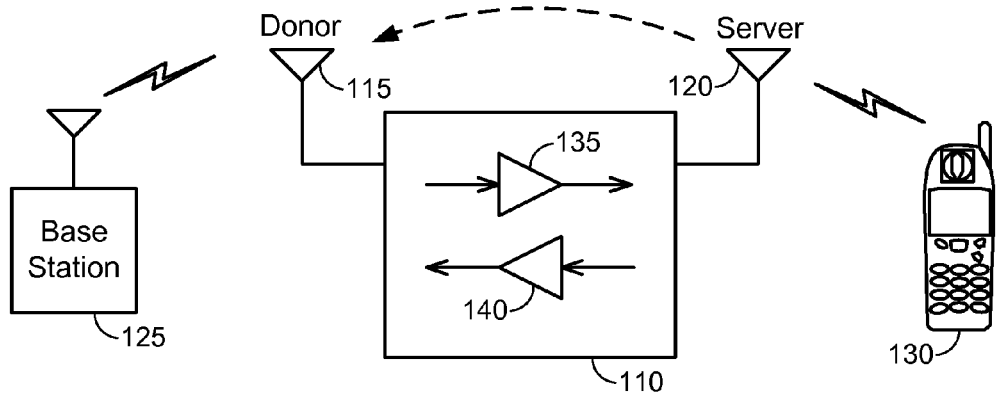
FIG. 1 is a simplified diagram of a repeater according to the prior art.
Figure 2:
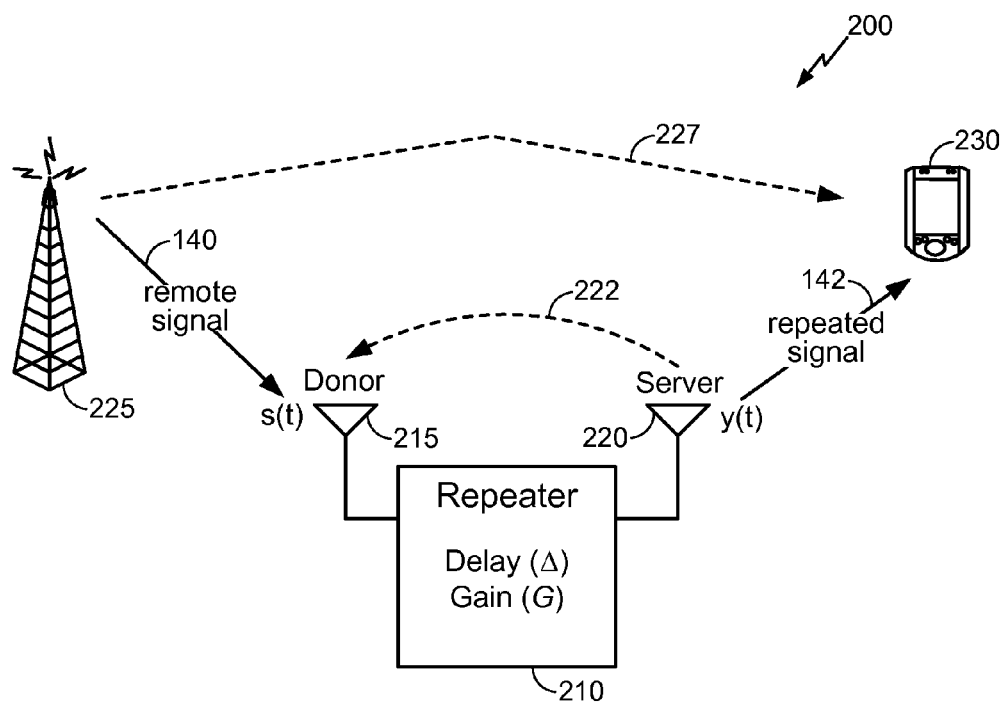
FIG. 2 shows a diagram of a repeater environment according to some embodiments of the current disclosure.

FIG. 2 shows a diagram of an operating environment 200 for a repeater 210 according to embodiments of the current disclosure. The example of FIG. 2 illustrates forward link transmissions; i.e., a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay Δ is configured to repeat a signal received from base station 225 on a donor antenna 215 to mobile device 230 using a server antenna 220. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where y(t)=√Gs(t−Δ). Ideally, the gain G would be large, the inherent delay Δ of the repeater would be small, the input SNR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. In other words, signal leakage is a result of the transmitted signal not being totally blocked by antenna isolation between the receiving and transmitting antennas. Without interference cancellation or other techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay A. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

In embodiments of the current disclosure, a repeater suitable for indoor coverage (e.g., business, residential, or similar use) is provided. The repeater has an active gain of about 70 dB or greater which is an example of a sufficient gain for coverage in a moderately sized residence. Furthermore, the repeater has a loop gain of less than one for stability (loop gain being referred to as the gain of the feedback loop between the transmitting antenna and the receiving antenna) and a sufficient amount of margin for stability and low output noise floor. In some embodiments, the repeater has a total isolation of greater than 80 dB. In some embodiments, the repeater employs interference/echo cancellation to achieve a high level of active isolation, which is significantly more challenging than the requirements of available repeaters.

Some techniques of the current disclosure utilize channel estimation to enable the required level of echo cancellation. By estimating the feedback channel (the channel between the antennas) to a sufficient degree of accuracy, the residual error, post echo cancellation, can be sufficiently below the remote signal to realize the desired loop gain margin for stability.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Channel Estimation Techniques

Accurate channel estimation is important for high fidelity baseband cancellation of the leakage signal in on-frequency repeaters. In a typical repeater, the pilot signal used for channel estimation is the amplified signal being transmitted to the mobile device (downlink) or the base station (uplink). The amplified signal leaks back from the transmit antenna to the receive antenna, resulting in a feedback signal being added to the remote signal at the repeater input. In an interference cancellation repeater, the feedback signal is estimated and then cancelled out. This increases the effective isolation between the donor and coverage antennas. If the estimate of the feedback channel is sufficiently accurate, the feedback signal can be almost completely subtracted out from the repeater input signal. The more accurate the channel estimate, the more amplification of the output signal the repeater can sustain while maintaining the required isolation for stability. In other words, the accuracy of the repeater's channel estimate and the repeater's achievable gain are directly related.

According to one aspect of the present invention, an echo cancellation repeater implements channel estimation in the frequency domain. Frequency domain channel estimation provides particular advantages such as reduced complexity and increased robustness. However, frequency domain channel estimation through the use of FFT-IFFT type processing typically relies on a cyclic prefix in the pilot signal for maintaining orthogonality. The problem with applying frequency domain channel estimation in repeater applications is that the "pilot signal" is really just the signal to be transmitted (or the amplified signal) and there is no inserted cyclic prefix in the "pilot" signal to ensure orthogonality of the different "frequency bins". Lack of a cyclic prefix, or equivalently having a channel that is longer that the cyclic prefix, is well known to introduce error terms in the channel estimation, including additive and multiplicative errors such as inter-symbol interference (ISI) and inter-carrier interference (ICI), hence degrading the accuracy of the channel estimation.

Systems and methods of the present invention provided herein enable the use of frequency domain channel estimation in an echo cancellation repeater in the absence of a cyclic prefix in the pilot signal which is the transmitted signal. Channel estimation performance degradation as a result of the lack of a cyclic prefix in the pilot signal is mitigated through the estimation and cancellation of the additive errors and multiplicative errors. Systems and methods for improving the accuracy of frequency domain channel estimation in an echo cancellation repeater through symbols pruning, sampling of non-causal taps and other techniques are also described.

Frequency domain channel estimation in a repeater using FFT-IFFT type processing on a pilot signal without cyclic prefix presents challenges in terms of additive and multiplicative noise errors, such as ICI and ISI error terms. The ICI and ISI error terms arise as a result of the convolution becoming linear rather than circular due to the lack of cyclic prefix and because the pervious symbol leaks into the new symbol when there is no cyclic prefix. In general, assume h is the perfect channel estimate of the feedback channel for a given channel tap in a repeater, the actual channel estimate for the given channel tap as a result of the lack of cyclic prefix becomes: $\alpha*h+m+z$, where m represents random noise, z represents the additive components of the ICI and ISI error terms, and a represents the multiplicative component of the ICI error term. Typically, the multiplicative error component a is very close to 1 but can affect accuracy in the estimation is a deviates from the value of 1. More specifically, the multiplicative noise error introduces bias to the channel estimate.

1. Cancellation of Multiplicative Errors

The use of frequency domain channel estimation in the absence of a cyclic prefix in the pilot signal introduces multiplicative error that degrade the accuracy of the channel estimation. The multiplicative error "$\alpha$" is given for each channel tap in the time domain. The multiplicative error is especially a problem when small block size is used for the FFT processing. In some embodiments of the present invention, a method to estimate and correct for the multiplicative error terms due to the use of frequency domain channel estimation in the absence of a cyclic prefix in the pilot signal (the amplified or transmit signal) is described. More specifically, the multiplicative error terms are manifested as scaling factors on the channel estimate. Accordingly, in some embodiments of the present invention, a channel estimation method performs scaling of a time domain channel estimate obtained from a frequency domain channel estimation process in the absence of a cyclic prefix in the pilot signal to correct the multiplicative error terms. The scaling operation applies a set of scalar multiplication factors ("scaling factors" or "correction scaling factors") to the time domain channel estimate obtained from the frequency domain channel estimation process. In some embodiments, the scaling factors depend only on the tap index and the block size used for the frequency domain channel estimation process.

In one embodiment, the frequency domain channel estimation process uses FFTs (Fast Fourier Transforms) to transform time domain signals into frequency domain signals, and obtains an estimate of the channel in the frequency domain by processing these frequency domain signals. The channel estimate in time domain obtained as a result of taking the IFFT (Inverse Fast Fourier Transforms) of the frequency domain channel estimate is a scaled replica of the channel being estimated (also referred to as the "original channel"), where each tap has a different scaling factor. To correct for the multiplicative error terms due to the lack of a cyclic prefix in the pilot signal (the transmit signal), the time domain channel estimate obtained from the IFFT operation is scaled using scaling factors that are function of only the tap index and the FFT block size or block length.

The set of scalar multiplication factors (or "scaling factors") is derived as follows. In the time domain, the channel estimation signal model assumes that an output signal y is the convolution of the feedback channel h with an input signal x, plus noise. That is, y=h*x+z, where z denotes the noise term. The input signal x is often referred to as the pilot signal for channel estimation. In an echo cancellation repeater, the input signal x of the channel estimation signal model is the echo cancelled transmit signal or the amplified signal of the repeater. The output signal y of the channel estimation signal model is the receive signal at the repeater. In other words, the receive signal y at the repeater is the pilot signal x (transmit signal) transmitted through the feedback channel h plus noise z. The feedback channel h may include one or more channel coefficients, associated with one or more delay paths in the channel.

Assuming that the FFT uses a block size of N and vectorizing, the receive signal can be expressed as y[k]=h*x[k], where k is [1 ... N] for a FFT block length of N. The feedback channel h may include multiple delay paths. Using standard matrix arithmetic, the ICI error term can be split up into an additive error component and a multiplicative error component. The multiplicative error component $\alpha_n$ of the ICI error term for a given tap n is given as:

$$\alpha_n = 1 - \frac{n}{N},$$

where n is the tap index (0 to N−1) and N is the block size of the FFT.

In sum, when channel estimation is performed in the frequency domain in the absence of a cyclic prefix, multiplicative error terms result and can be estimated to be $$1 - \frac{n}{N},$$

where n is the tap index and N is the FFT block size. In the channel estimation method of the present invention, the multiplicative error terms are cancelled out by scaling the time domain channel estimate using a set of scalar multiplication factors given as $$\left(1 - \frac{n}{N}\right)^{-1}.$$

Figure 3:
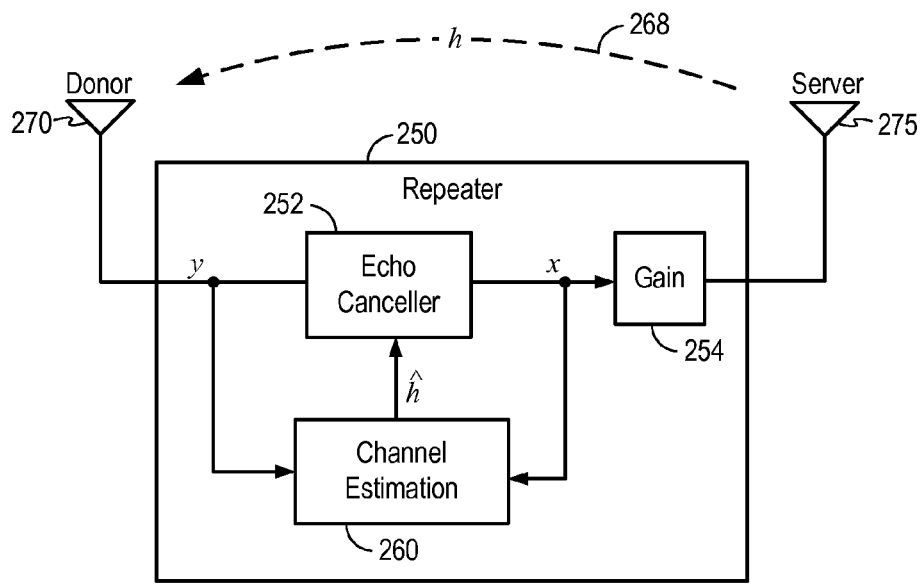
FIG. 3 is a block diagram of a repeater implementing interference cancellation according to one embodiment of the present invention.

In embodiments of the present invention, a wireless repeater incorporates a channel estimation module configured to perform frequency domain channel estimation using the channel estimation method described above for cancelling multiplicative errors in the channel estimate. FIG. 3 is a block diagram of a repeater implementing interference cancellation according to one embodiment of the present invention. Referring to FIG. 3, a repeater 250 receives an input signal on a donor antenna 270 for downlink communications. Repeater 250 also transmit an output signal on a server antenna 275 for downlink communications. Repeater 250 includes an echo canceller 252 for implementing cancellation of the feedback signal. Repeater 250 amplifies the echo cancelled transmit signal at a gain stage 254 providing a variable gain G. Repeater 250 also includes a channel estimation module 260 for estimating the feedback channel 268 (denoted as "h") between antennas 275 and 270. Channel estimation module 260 provides a channel estimate ĥ to echo canceller 252 to enable the estimation and cancellation of the undesired feedback signal.

In operation, repeater 250 receives the receive signal y being the sum of a remote signal to be amplified and a feedback signal (or leakage signal) being the version of the transmitted signal that leaks back from the transmit antenna into the receive antenna. For the purpose of channel estimation, the transmit signal x, or a signal indicative of the transmit signal x, is used as the pilot signal and the remote signal is treated as noise. Repeater 250, being an echo cancellation repeater, operates to estimate the feedback signal in order to cancel out the undesired feedback signal component in the receive signal. To that end, channel estimation module 260 generates a feedback channel estimate ĥ for echo canceller 252. Echo canceller 252 generates a feedback signal estimate based on the feedback channel estimate. Echo canceller 252 subtracts the feedback signal estimate from the receive signal y to generate the echo cancelled transmit signal x. As long as the feedback signal estimate is accurate, the undesired feedback signal is removed from the receive signal and echo cancellation is realized. In the present embodiment, the echo cancelled transmit signal x is coupled to a variable gain stage 254 providing a gain of G to the echo cancelled transmit signal before transmission on antenna 275. FIG. 3 illustrates only elements that are relevant to operation of the channel estimation method of the present invention. Repeater 250 may include other elements not shown in FIG. 3 but known in the art to realize the complete repeater operation.

The channel estimation module 260 performs frequency domain channel estimation. The results of the frequency domain channel estimation is converted to a time domain channel estimate (such as through IFFT) that may include multiplicative errors due to the lack of a cyclic prefix in the pilot signal. Channel estimation module 260 operates to scale the time domain channel estimate obtained from the frequency domain channel estimation process using a set of scalar multiplication factors ("scaling factors" or "correction scaling factors") where the scalar multiplication factors are function of only the tap index and the FFT block size, as described above. The scaled time domain channel estimate ĥ can then be used by echo canceller 252 for echo cancellation. The scalar multiplication factors have the effect of improving the accuracy of the channel estimation by canceling the multiplicative error terms resulted from the frequency domain channel estimation on a pilot signal in the absence of a cyclic prefix.

Figure 4:
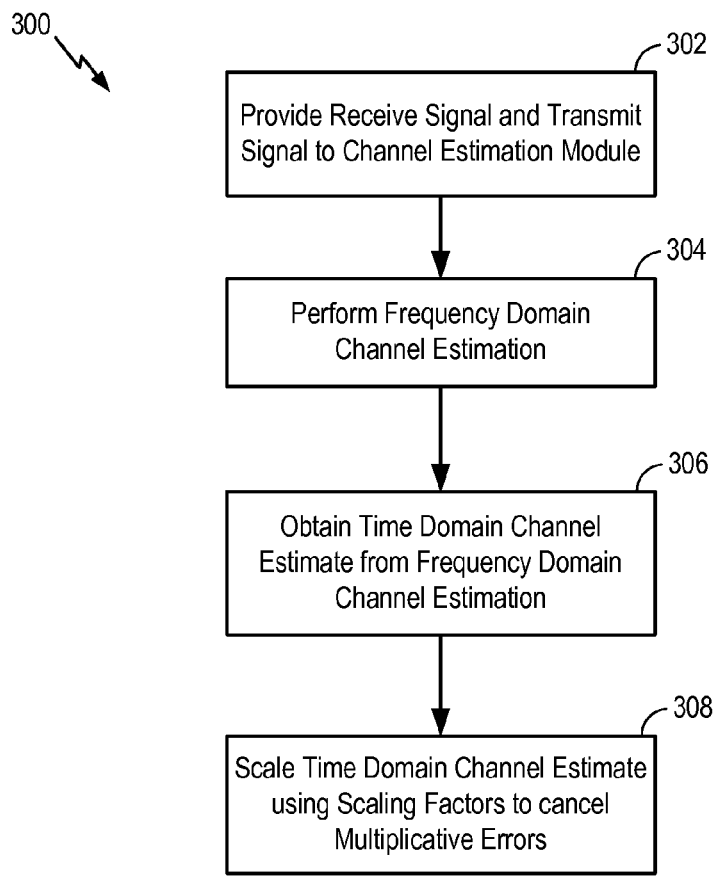
FIG. 4 is a flowchart illustrating the channel estimation method for cancelling multiplicative error terms which can be implemented in the repeater of FIG. 3 according to one embodiment of the present invention.

FIG. 4 is a flowchart illustrating the channel estimation method for cancelling multiplicative error terms which can be implemented in the repeater of FIG. 3 according to one embodiment of the present invention. Referring to FIG. 4, channel estimation method 300 starts by receiving the receive signal y and the transmit signal x at the channel estimation module (step 302). The channel estimation module performs frequency domain channel estimation (step 304). In one embodiment, the channel estimation module performs Fast Fourier Transform (FFT) on N-sample blocks of the transmit signal as the pilot signal and N-sample blocks of the receive signal. As a result of the FFT operation, frequency domain pilot signal blocks and frequency domain receive signal blocks are generated from blocks of N samples of the pilot signal and the receive signal. A channel estimate in the frequency domain is obtained from these frequency domain samples. Then, the channel estimation method obtains a time domain channel estimate from the frequency domain channel estimate, such as by performing Inverse Fast Fourier Transform (IFFT) operations (Step 306). The IFFT is performed on a signal generated by one or more signal processing operations on the frequency domain pilot blocks and the frequency domain receive signal blocks. Finally, the channel estimation method scales the time domain channel estimate using a set of correction scaling factors (step 308). In one embodiment, the correction scaling factors are function of only the tap index and the FFT block size. The resulting scaled channel estimate can then be used for echo cancellation in the repeater.

In one embodiment, the scaling of the time domain channel estimate is applied after the IFFT operation. In other embodiments, the scaling of the time domain channel estimate can also be carried out after averaging, or other signal processing operations such as truncation or thresholding operations.

In repeater 250, channel estimation module 260 may be implemented in software, hardware, firmware, or some combination, and may be configured to perform the functions described in the embodiments described herein. In a software implementation, channel estimation module 260 may comprise memory and one or more processors that may be dedicated to the channel estimation module 260 or be shared with other features or modules of the repeater. N-sample blocks indicative of the transmit signal may be stored in memory, as well as N-sample blocks indicative of the receive signal. The processor may access instructions to read the stored data and perform FFT operations on the data to generate frequency domain pilot signal blocks and frequency domain receive signal blocks. The processor may access instructions to generate a frequency domain channel estimate from the frequency domain pilot and receive signal blocks. The processor may access instructions to perform an inverse fast Fourier transform on the frequency domain channel estimate to generate a time domain channel estimate. In some embodiments, the processor may access information indicative of one or more scaling factors to scale the time domain channel estimate, while in some embodiments scaling is performed prior to the IFFT operations. Similarly, in a hardware implementation, the FFT and IFFT operations may be performed using hardware such as a digital signal processor (DSP).

By scaling the time domain channel estimate using the scalar multiplication factors described above, the multiplicative error term in the frequency domain channel estimation is eliminated and the channel estimation performance is improved.

2. Cancellation of ICI/ISI Error Terms

As described above, the use of frequency domain channel estimation in the absence of a cyclic prefix introduces errors such as inter-carrier interference (ICI) and inter-symbol interference (ISI) that degrade the accuracy of the channel estimation. More specifically, the ICI/ISI errors arise as a result of the difference between a linear convolution and a circular convolution in the frequency domain channel estimation process due to the lack of a cyclic prefix in the pilot signal. If there is no cyclic prefix, the previous symbol will leak into the current one, causing inter-symbol interference. According to embodiments of the present invention, a method to estimate the ICI and ISI error terms in the frequency domain channel estimate and remove the error terms from the channel estimate is provided to improve the accuracy of the channel estimation. The channel estimation method for canceling ICI/ISI errors can be implemented in an echo cancellation repeater such as repeater 250 of FIG. 3. For instance, the channel estimation module 260 can implement the channel estimation method of the present invention for canceling ICI/ISI errors due to the use of frequency domain channel estimation in the absence of a cyclic prefix in the pilot signal.

In frequency domain channel estimation processing, symbols of the pilot signal (the transmit signal), as well as symbols of the receive signal, are grouped in blocks of length N, where N is the size of the FFT being performed on both the pilot symbols and the receive symbols. The receive symbols are assumed to be the linear convolution of the pilot symbols and the channel, plus noise. Because there is no cyclic prefix, the pilot symbols of the previous block leak into the current receive symbols block, causing ISI (inter-symbol interference). Similarly, ICI (inter-carrier-interference) is also created on account of the lack of a cyclic prefix. In the absence of a cyclic prefix, the receive symbols are just a linear convolution of the pilot symbols and the channel. If there was a cyclic prefix in the pilot symbols, the received symbols would be the circular convolution of the current block of pilot symbols and the channel. The difference between circular and linear convolution results in ICI error terms.

More specifically, let H(f) denotes the perfect feedback channel estimate, P(f) denotes the Fast Fourier Transform of one block of N samples of the pilot signal, that is, P(f)=FFT (pilot), and R(f) denotes the Fast Fourier Transform of one block of N samples of the receive signal, that is, R(f)=FFT (rx_signal), the feedback channel estimate Ĥ(f) for a particular frequency, if computed only using one block of pilot signal and one block of receive signal, is given as:

$$\hat{H}(f) = \frac{P(f) * R(f)}{P(f) * P(f)}$$

$$= \frac{P(f) * (feedbacksignal + remotesignal)}{P(f) * P(f)}$$

-continued $$= \frac{P(f) * (H(f)P(f) + remotesignal)}{P(f) * P(f)} + ICI + ISI$$

$$= H(f) + \frac{P(f) * remotesignal}{P(f) * P(f)} + ICI + ISI,$$

where "P(f)*R(f)" denotes conjugate of the pilot symbols and the receive symbols at the particular frequency. The use of frequency domain channel estimation in the absence of a cyclic prefix introduces the error terms ICI and ISI as shown above. These error terms degrade the accuracy of the channel estimation.

In accordance with embodiments of the present invention, the ICI error terms are reconstructed using the most recent channel estimate, and introduced to the current receive symbol block so that the receive symbols block approximately equals to the circular convolution of the current pilot symbols block and the feedback channel. Similarly, the ISI terms are reconstructed using the most recent channel estimate and introduced to the current receive symbols block to minimize the leakage from the previous block of pilot symbols. The removal of the ISI terms also renders the receive symbols block approximately equals to the circular convolution of the current pilot symbols block and the feedback channel. In this manner, ICI and ISI error terms in the channel estimate are cancelled out and a more accurate channel estimate is obtained.

In one embodiment, the ICI error term and the ISI error term are reconstructed as follows. Using the same channel estimation signal model described above, the receive signal y can be modeled as a linear convolution of the transmit signal x (the pilot signal) with the feedback channel h plus noise. More specifically, assuming the feedback channel has a length of L and is given as h=[h(0) h(1) . . . h(L)], the receive signal sample y(n) can be expressed as:

$$y(n) = \sum_{k=0}^{L} x(n-k)h(k) + z(n),$$

where z(n) denotes the noise samples. The channel estimation process estimates the channel h using the receive samples y(n) assuming that the transmit (pilot) samples x(n) are known.

In frequency domain channel estimation, such as FFT-IFFT type processing, the receive samples y(n) are divided into blocks of length N and the i-th block of the receive samples is expressed as:

$$y_N^i = y^i = [y_1^i, y_2^i L y_N^i]^T.$$

A linear convolution matrix $L^i$ for the i-th block of the pilot samples x(n) is given as:

$$L_{N \times N}^i = L^i = \begin{pmatrix} x_1^i & x_N^{i-1} & x_{N-1}^{i-1} & L & x_1^{i-1} \\ x_2^i & x_1^i & x_N^{i-1} & L & x_2^{i-1} \\ x_3^i & x_2^i & x_1^i & L & x_3^{i-1} \\ M & M & M & O & M \\ x_N^i & x_{N-1}^i & x_{N-2}^i & L & x_1^i \end{pmatrix}.$$

A circular convolution matrix $C^i$ for the i-th block of the pilot samples x(n) is given as:

$$C_{N \times N}^i = C^i = \begin{pmatrix} x_1^i & x_N^i & x_{N-1}^i & L & x_1^i \\ x_2^i & x_1^i & x_N^i & L & x_2^i \\ x_3^i & x_2^i & x_1^i & L & x_3^i \\ M & M & M & O & M \\ x_N^i & x_{N-1}^i & x_{N-2}^i & L & x_1^i \end{pmatrix}.$$

Due to the lack of cyclic prefix in the pilot samples x(n), the convolution with the feedback channel becomes a linear convolution rather than the ideal circular convolution. The receive sample block $y^i$ can be written in matrix-vector notation using the linear convolution matrix $L^i$ as follows:

$$y^i = L^i h + z^i.$$

Because the receive samples y(n) should ideally be a circular convolution of the pilot samples with the feedback channel, not a linear convolution, the receive sample block $y^i$ can be expressed using the circular convolution matrix and the linear convolution matrix as follows:

$$y^i = C^i h + (L^i - C^i) h + z^i.$$

The first term in the above expression is the ideal circular convolution of the pilot samples with the feedback signal. The second term in the above expression represents the ICI/ISI error terms resulted from the difference between the circular convolution and linear convolution. Since both the linear convolution matrix $L^i$ and the circular convolution matrix $C^i$ are based on the pilot samples and are known, the ICI and ISI error terms can be computed using the latest channel estimate h. The computed error terms can then be subtracted from the receive sample block to remove the ICI/ISI errors and the channel estimate can be computed using the corrected receive sample block to yield a more accurate channel estimate.

In one embodiment, the ICI and ISI error terms are eliminated by subtracting the circular convolution matrix from the linear convolution matrix first ($L^i - C^i$) multiplying by the latest channel estimate ĥ and then subtracting the difference ($L^i - C^i$)*ĥ from the receive sample block $y^i$. In this case, the error is subtracted in the time domain. The channel would then be estimated using frequency domain processing.

Applying frequency domain processing, such as by taking the Discrete Fourier Transform (DFT) of the receive sample block $y^i$ using an N×N DFT matrix F, the receive sample block in frequency domain is given as:

$$Y^i = \text{diag}(X^i)H + F(L^i - C^i)h + Z^i,$$

where $X^i$, H and $Z^i$ are the DFT of $x^i$, h and $z^i$, respectively.

To eliminate the ICI and ISI error terms, the ICI and ISI error terms are subtracted from the receive sample block. The subtraction can take place in the time domain or in frequency domain. Assuming ĥ is the latest channel estimate or the most recent channel estimate, the latest channel estimate can be used to calculate an updated channel estimate as follows:

$$Y^i - F(L^i - C^i)\tilde{h} = \text{diag}(X^i)H + F(L^i - C^i)(h - \tilde{h}) + Z^i.$$

By incorporating the $F(L^i - C^i)\tilde{h}$ error correction term in the receive sample block, the error in the channel estimate is cancelled. The result of introducing the error correction term in the receive sample block is to make the receive sample block look more like the result of a circular convolution. In this example, the error term is subtracted in the frequency domain.

To compute the channel estimate, if only using one block of pilot samples and one block of receive samples, the frequency domain channel estimate Ĥ is given as:

$$\hat{H} = \text{diag}(X^i)^{-1} Y_C^i,$$

where $Y_C^i$ denotes the corrected $Y^i$ being $(Y^i - F(L^i - C^i)\tilde{h})$. In this case, the error term on the channel estimation can be expressed as: $\text{diag}(X^i)^{-1} * F(L^i - C^i) * \tilde{h}$. This error term on the channel estimate can be subtracted out directly from the channel estimate. According to another aspect of the present invention, the computed error correction term is processed through the channel estimation process and then the processed channel estimate error term is subtracted from the computed channel estimate.

The time domain channel estimate is formed by taking the inverse DFT of Ĥ and is given as:

$$\hat{h} F^{-1} \hat{H} = [\hat{h}_0, \hat{h}_1, \hat{h}_2, L\hat{h}_M, \hat{h}_M, \hat{h}_{M+1}, \hat{h}_{N-1}].$$

The larger the FFT block size N, and the smaller the channel length L, the better the channel estimate Ĥ is.

In the above description, the frequency domain channel estimation process is performed using a Discrete Fourier Transform (DFT). In other embodiments, the frequency domain channel estimate process can be performed using a Fast Fourier Transform (FFT). The use of a specific type of frequency domain signal processing is not critical to the practice of the present invention.

Figure 5:
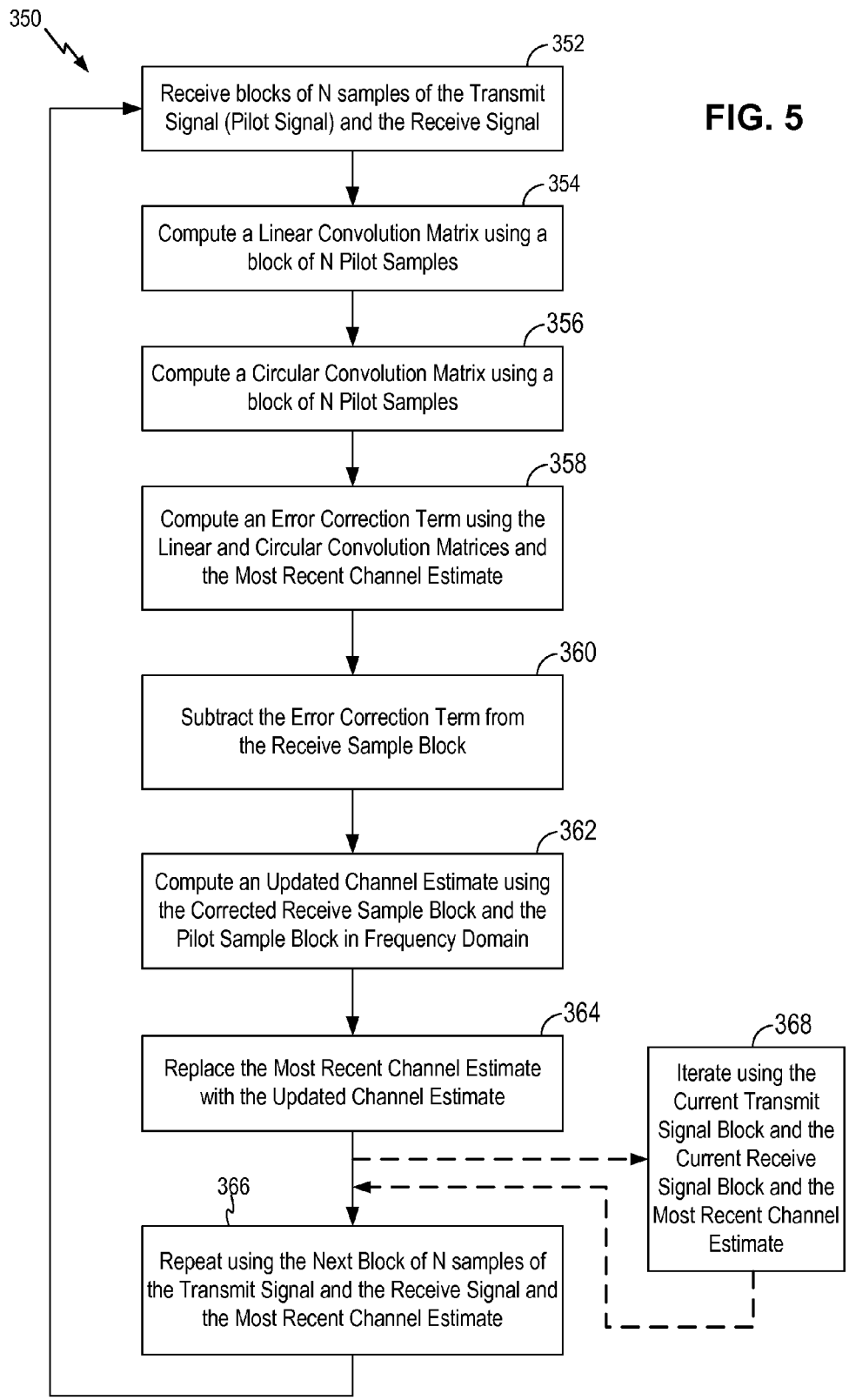
FIG. 5 is a flowchart illustrating the channel estimate method for cancelling the ICI/ISI error terms which can be implemented in the repeater of FIG. 3 according to one embodiment of the present invention.

FIG. 5 is a flowchart illustrating the channel estimate method for cancelling the ICI/ISI error terms which can be implemented in the repeater of FIG. 3 according to one embodiment of the present invention. Referring to FIG. 5, channel estimation method 350 starts by receiving blocks of N samples of the transmit signal (the pilot signal) and the receive signal (step 352). Then, using the block of N pilot samples and a current channel estimate or the most recent channel estimate, method 350 estimates an error correction term. In the present embodiment, method 350 computes a linear convolution matrix $L^i$ (step 354) and also computes a circular convolution matrix C (step 356). Then, the error correction term is computed using the linear and circular convolution matrices and the most recent channel estimate (step 358). More specifically, the error correction term is $(L^i - C^i)\tilde{h}$ in the time domain and $F(L^i - C^i)\tilde{h}$ in the frequency domain where h denotes the latest or most recent channel estimate and F is a frequency domain transform. Then, the error correction term is subtracted from the receive sample block (step 360). The subtraction can be carried out in the time domain or in the frequency domain. An updated channel estimate is then computed using the corrected receive sample block and the pilot sample block in frequency domain (step 362). In some embodiments, the updated channel estimate is computed using the current block of corrected receive samples and pilot samples as well as previous blocks of similarly corrected receive samples and their corresponding pilot samples. The most recent channel estimate is then replaced with the updated channel estimate (step 364).

In an alternate embodiment, the channel estimation method for ICI/ISI error terms reconstruction and removal is repeated on the next block of N samples of the transmit signal and the receive signal using the latest or most recent channel estimate to compute the error correction term to improve the channel estimate (step 366). In each repetition, the ICI/ISI error correction term is computed using the latest channel estimate and then removed from the receive samples to provide an improved channel estimate. In another alternate embodiment, the channel estimation method for ICI/ISI error terms reconstruction and removal is iterated on the current block of N samples of the transmit signal and the receive signal for a fixed number of iterations (step 368). In each iteration, the ICI/ISI error correction term is computed using the latest channel estimate and then removed from the receive samples to provide an improved channel estimate. Multiple iterations of the method of the present invention enhance the accuracy of the channel estimate. Then, after the current sample blocks have been iterated for the fixed number of iterations, the channel estimation method repeats on the next block of N samples of the transmit signal and the receive signal using the latest or most recent channel estimate to compute the error correction term. In FIG. 5, step 368 illustrates an alternate embodiment of the channel estimation which is optional and may be omitted if iteration on the same sample blocks is not desired.

As described above, channel estimation module 260 in repeater 250 may be used to implement the channel estimate method of the present invention for cancelling the ICI/ISI error terms. Channel estimation module 260 may be implemented in software, hardware, firmware, or some combination, and may be configured to perform the functions described in the embodiments described herein. In a software implementation, channel estimation module 260 may comprise memory and one or more processors that may be dedicated to the channel estimation module 260 or be shared with other features or modules of the repeater. N-sample blocks indicative of the transmit signal may be stored in memory, as well as N-sample blocks indicative of the receive signal. The processor may access instructions to read the stored data and compute the linear convolution matrix and compute the circular convolution matrix. The processor may further access instructions to compute the error correction term and to subtract the error correction term from the receive samples. The processor may access instructions to generate updated channel estimates from the corrected receive sample block and to replace the most recent channel estimate with the updated channel estimate. In some embodiments, the processor may access instructions to iterate the computation using the current receive samples and pilot samples for a fixed number of iterations. In some other embodiments, the processor may access instructions to repeat the computation using the next block of receive and pilot samples. Similarly, in a hardware implementation, the convolution computation and channel estimate computation operations may be performed using hardware such as a digital signal processor (DSP).

Reconstructing the ICI/ISI error terms with the latest channel estimate, and then removing these error terms from the actual channel estimate reduce the error floor in the frequency domain channel estimation caused by not having a cyclic prefix in the pilot signal. The correction of these error terms to the channel estimate enables the use of frequency domain channel estimate in a wireless repeater. As described above, performing channel estimation in the frequency domain, as opposed to the time domain, is desirable because of complexity considerations and because time domain channel estimation algorithms can have issues with robustness. However, channel estimation in the frequency domain requires a cyclic prefix in the pilot signal for accurate channel estimation. In some applications, it is not possible to add a cyclic prefix to the pilot signal. The channel estimation method of the present invention provides particular advantages by mitigating the channel estimation performance loss due to the lack of a cyclic prefix. Improvement in the channel estimation, in the context of a repeater, allows a significant improvement in the amount of gain achievable. Furthermore, even for a given, fixed gain in the repeater, when the channel estimate improves, the output SNR (signal-to-noise ratio) increases (where output SNR is a measure of the noise introduced by the repeater), meaning that the fidelity of the repeater improves.

3. Retain Non-Causal Tap

The use of frequency domain channel estimation in the absence of a cyclic prefix in the pilot signal introduces ICI and ISI error terms that degrade the accuracy of the channel estimation. More specifically, the ICI/ISI error terms arise as a result of the difference between the linear convolution and the circular convolution due to the lack of a cyclic prefix in the pilot signal.

According to embodiments of the present invention, a channel estimation method operates to capture both the causal and the non-causal taps of the channel in generating the channel estimate. By capturing the non-causal taps as well as the causal taps of the channel, a more accurate channel estimate can be obtained. In some embodiments of the present invention, a channel estimation method for mitigating the channel estimation performance loss due to the lack of a cyclic prefix in the pilot signal shifts the largest channel tap in the channel estimate to the reference time "0" for channel estimation. However, shifting the channel tap in this manner causes all the channel taps that occur before the largest tap to become "non-causal" taps. That is, part of the feedback channel to be estimated becomes non-causal. Discarding these non-causal taps from the channel estimation can introduce a potentially large error floor which could result in instability in the feedback loop of the repeater. Accordingly, the channel estimation method of the present invention operates to capture both the causal and the non-causal taps of the channel in generating the channel estimate.

For instance, in one exemplary repeater system, discarding the non-causal part of the channel may result in instability well before the repeater has reached full gain. However, when the non-causal taps of the channel is sampled according to the channel estimation method of the present invention, a ~20 dB output SNR gain can be achieved when the repeater reaches full gain.

Figure 6:
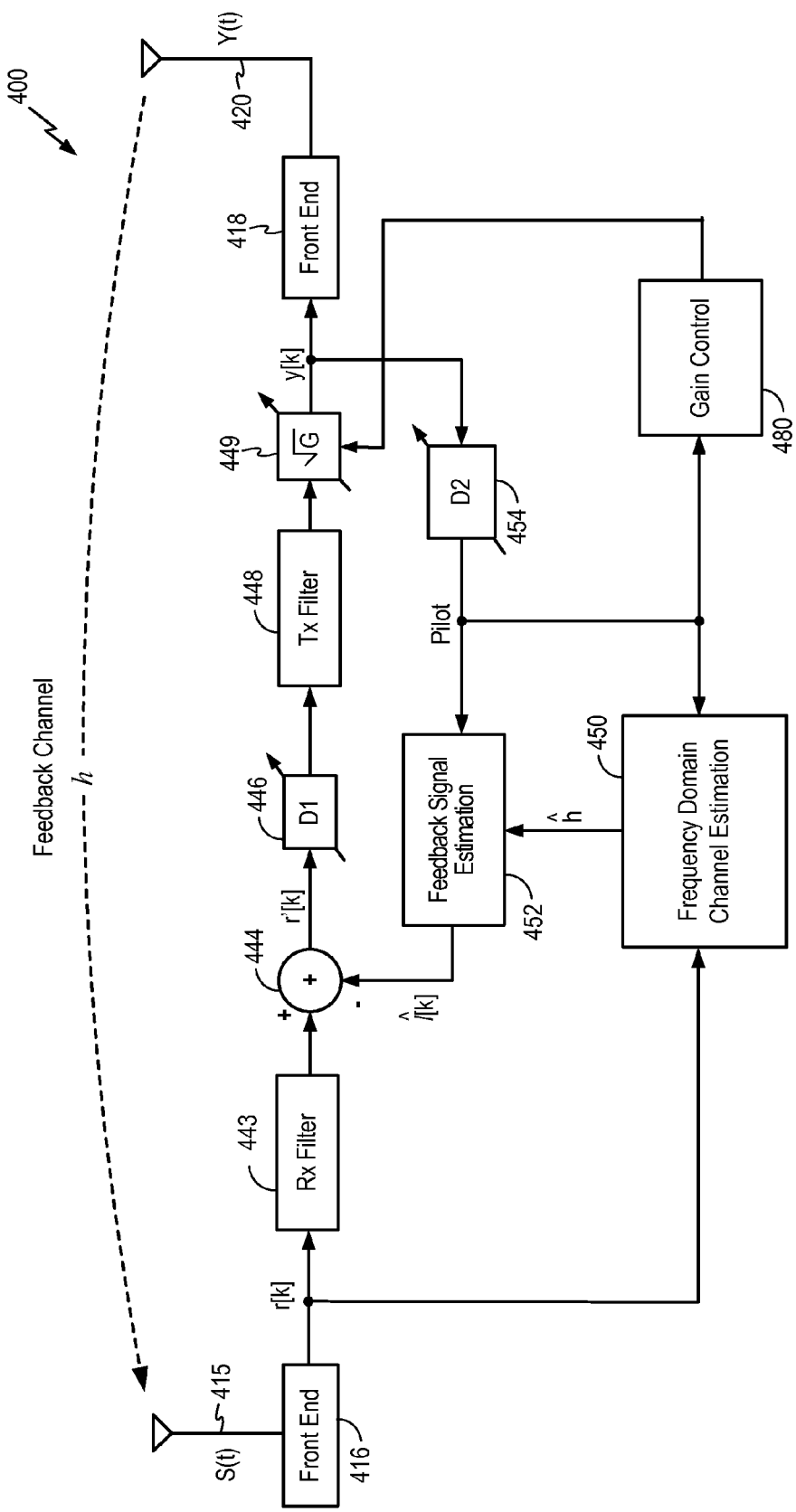
FIG. 6 is a detail block diagram of a repeater in which the channel estimation method for sampling both causal and non-causal taps can be implemented according to one embodiment of the present invention.

FIG. 6 is a detail block diagram of a repeater in which the channel estimation method for sampling both causal and non-causal taps can be implemented according to one embodiment of the present invention. Referring to FIG. 6, a repeater 400 receives a remote signal S(t) on a donor antenna 415 which is coupled to receive circuitry including a transceiver front end circuit 416 and a receive filter 443. The receive signal samples r[k] from the transceiver front end circuit 416 are coupled to receive filter (Rx filter) 443 and then to an echo canceller including a summer 444 for echo cancellation. The echo cancelled receive signal r'[k] is coupled to a delay element 446 to introduce a desired amount of delay D1 to decorrelate the transmit signal from the remote signal. Delay element 446 can be a fixed delay or a variable delay element as shown in FIG. 6. In other embodiments, delay element 446 can be provided before the echo canceller. The delayed echo cancelled signal is coupled to transmit circuitry including a transmit filter (Tx filter) 448, a gain stage 449 applying a gain of G and a transceiver front end circuit 418. Gain stage 449 generate the transmit signal samples y[k] which are provided to transceiver front end circuit 418. Repeater 400 transmits the transmit signal Y(t) generated by transceiver front end circuit 418 on a coverage antenna 420.

In repeater 400, a gain control block 480 controls the variable gain of gain stage 449 and a channel estimation block 450 performs channel estimation of the feedback channel. The transmit signal samples y[k] are used as the pilot signal for the gain control block 480 and the channel estimation block 450. In accordance with the present invention, the channel estimation block 450 implements frequency domain channel estimation, such as FFT-IFFT type processing or DFT-IDFT type processing. Channel estimation block 450 also receives the receive signal samples r[k] and perform channel estimation to generate a feedback channel estimate ĥ. More specifically, channel estimation block 450 generates the feedback channel estimate ĥ using at least N samples of the pilot signal and N samples of the receive signal r[k]. The feedback channel estimate ĥ is provided to a feedback signal estimation block 452 which, together with the transmit signal y[k], computes a feedback signal estimate Î[k]. In the case where the echo canceller is applied to the receive signal after filtering, the feedback signal estimate computation should also go through the same filtering to generate the corresponding feedback signal estimate. In the present embodiment, the canceller 444 is positioned after the receive filter, therefore, the feedback signal estimate Î[k] is computed as the convolution of the feedback channel estimate with the transmit signal y[k] and also with the receive filter (Rx filter 443). The feedback signal estimate l[k] is provided to summer 444 to be subtracted from the receive signal r[k] for realizing echo cancellation.

According to the channel estimation method of the present invention, the pilot samples y[k] are shifted so that the largest channel tap is moved to a reference time "0". To that end, a variable delay element 454 introduces a delay D2 to the pilot samples before the pilot samples are provided to the channel estimation block 450. The adjustable delay D2 operates to delay the pilot signal in time and the desired amount of delay D2 is introduced so that the largest channel tap is aligned with the reference time 0.

Figure 7:
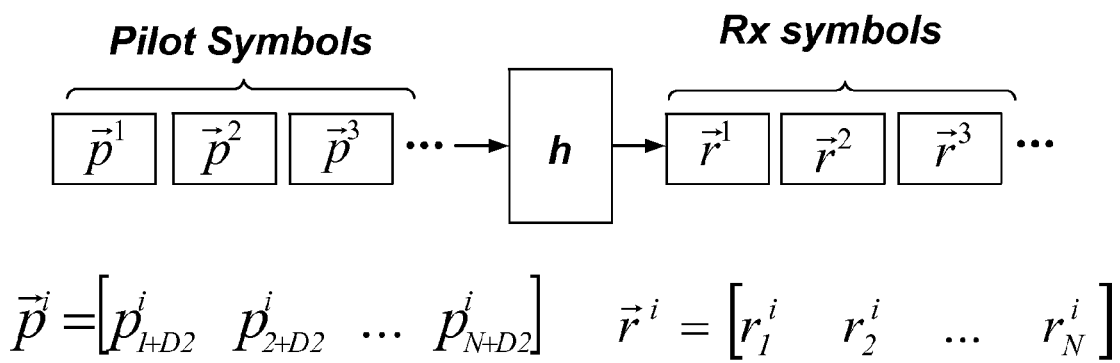
FIG. 7 illustrates the relationship between the receive signal, the pilot signal and the feedback channel.

In frequency domain channel estimation processing, samples of the pilot signal (the transmit signal), as well as samples of the receive signal, are grouped in blocks of length N, where N is the size of the frequency transform (such as FFT). FIG. 7 illustrates the relationship between the receive signal, the pilot signal and the feedback channel. More specifically, the receive signal is the pilot signal convolve with the feedback channel h. According to embodiments of the present invention, the channel estimation method applies a variable delay, such as through variable delay element 454, to each block $\vec{p}^1, \vec{p}^2, \vec{p}^3$ of N pilot samples. Thus, each block of pilot samples is delayed by delay D2 so that: $\vec{p}^1 = [p_{1+D2}, p_{2+D2} L p_{N+D2}]$. The delayed pilot samples are then sent with the receive samples to the channel estimation block to estimate the feedback channel. The receive samples $\vec{r}^1, \vec{r}^2, \vec{r}^3$ are not delayed so that: $\vec{r}^i = [r_1^i, r_2^i L r_N^i]$.

Figure 8:
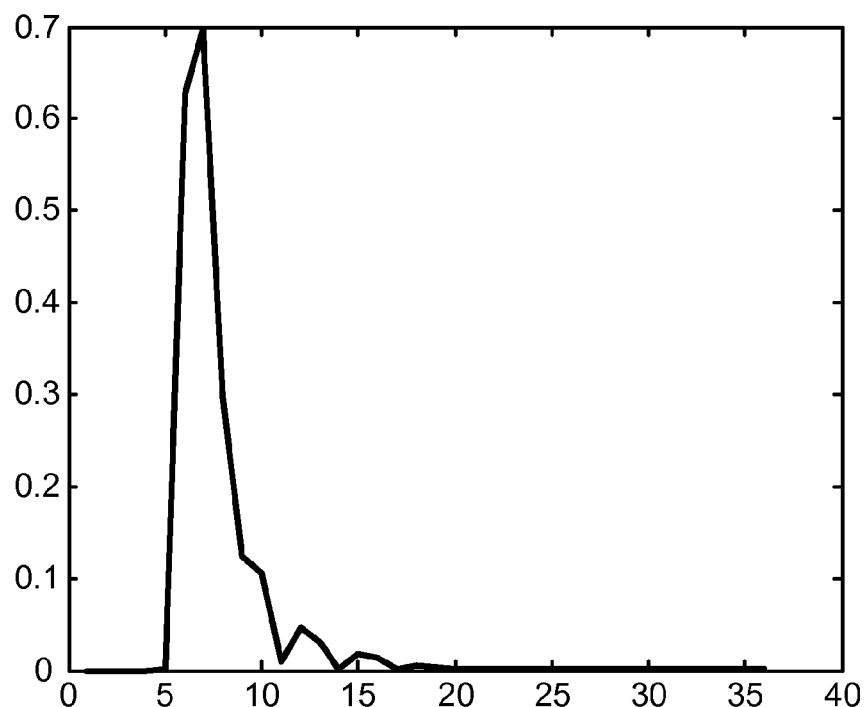
FIG. 8 illustrates the channel response of the channel estimate without the delay adjustment to left shift the pilot signal samples.
Figure 9:
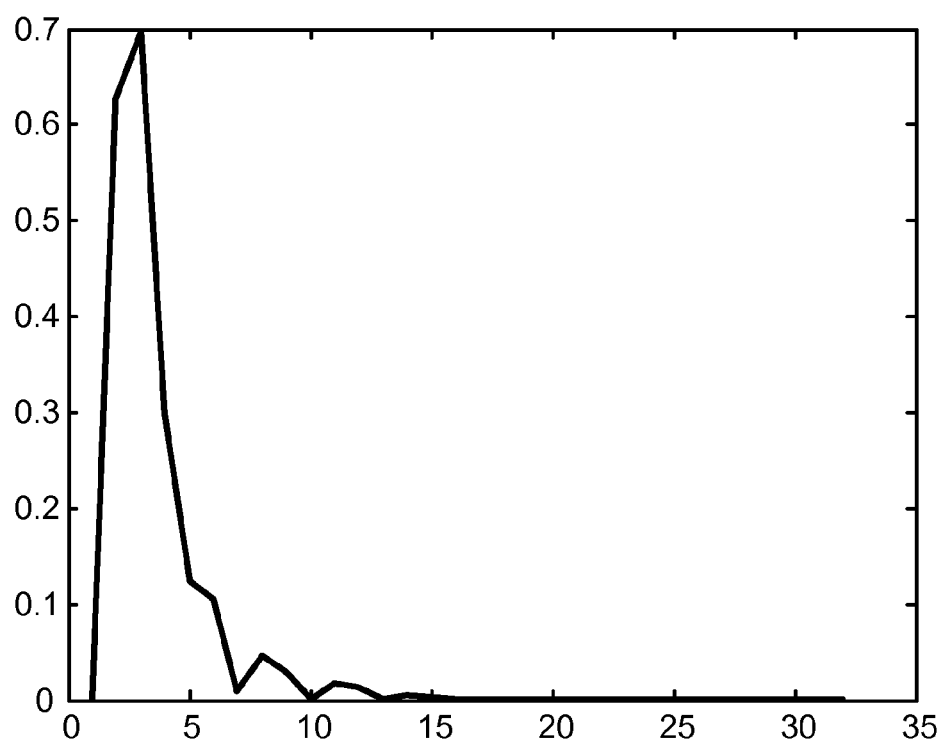
FIG. 9 illustrates the channel response of the channel estimate after the delay adjustment to left shift the pilot signal samples.

As described above, the left shifting of the pilot signal causes part of the channel to be estimated to become non-causal. FIG. 8 illustrates the channel response of the channel estimate without the delay adjustment to left shift the pilot signal samples. FIG. 9 illustrates the channel response of the channel estimate after the delay adjustment to left shift the pilot signal samples. Referring to FIG. 8, without any delay adjustment, the largest channel tap does not align with reference time 0. However, referring to FIG. 9, after applying an appropriate amount of delay D2, the largest channel tap of the channel response is now shifted to the left to be aligned with reference time 0.

Figure 10:
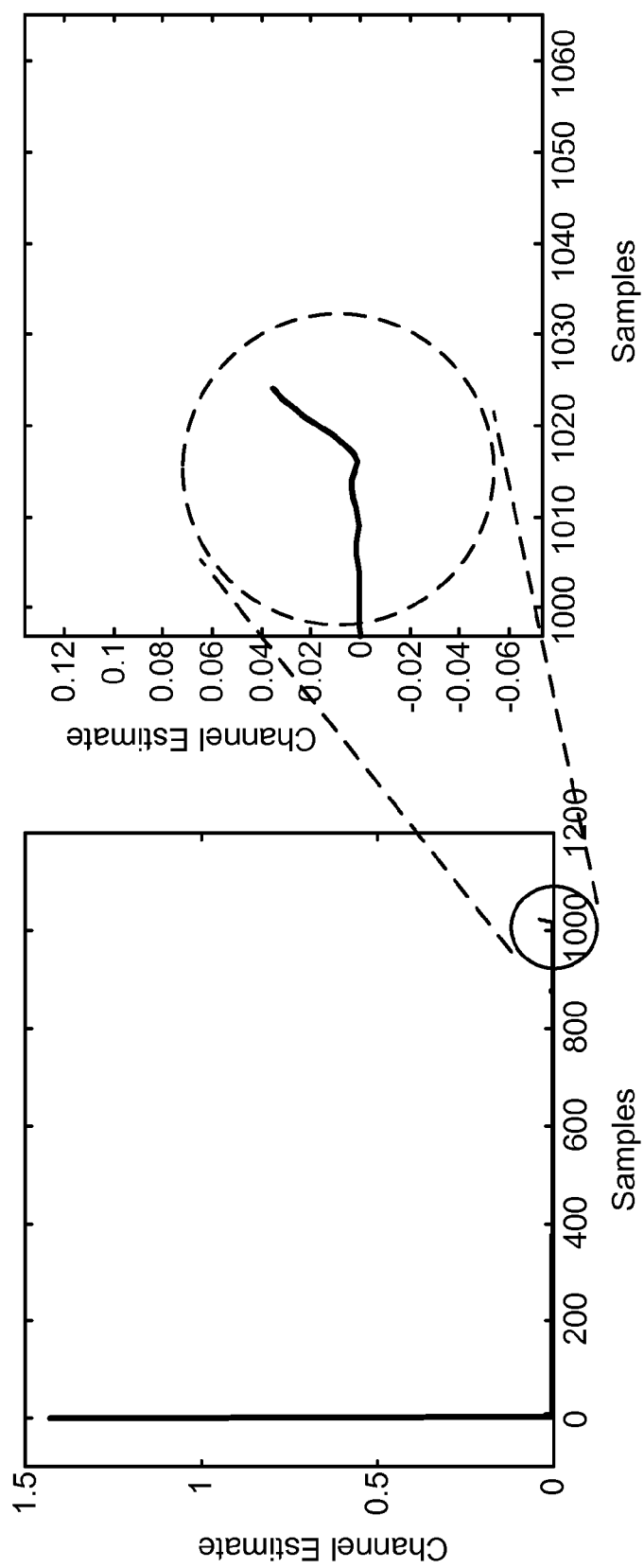
FIG. 10 illustrates the channel response of the channel estimate showing the causal taps and the non-causal taps to be used by the channel estimation method according to one embodiment of the present invention.

FIG. 10 illustrates the channel response of the channel estimate showing the causal taps and the non-causal taps to be used by the channel estimation method according to one embodiment of the present invention. Referring to FIG. 10, as a result of the left shifting of the pilot signal samples, the largest channel tap is now at reference time 0. However, there is some signal energy present at the end of the FFT block, as shown by the enlarged graph in FIG. 10. The signal energy at the end of the FFT block is indicative of the channel taps that become non-causal due to the left shifting of the pilot samples.

According to embodiments of the present invention, the channel estimation method retain both the causal taps and the non-causal taps in the time domain feedback channel estimate. In one embodiment, the channel estimate is of a length N. For channel estimation purpose, M1 causal taps and M2 non-causal taps are retained in the channel estimate. The causal taps are taken from sample 0 to M1, where M1 is assumed to be much less than N since the delay spread of the feedback channel for the repeater is typically small. The non-causal taps are taken from sample N−M2 to N, where M2 is assumed to be much less than N for the same reason as M1. In one embodiment, the total channel estimate (both the causal and the non-causal taps M1+M2) is less than N taps and only M1+M2 taps of the channel estimate are kept.

Returning to FIG. 6, the receive filter Rx filter 443 lies after the received samples are tapped for channel estimation and before the summer 444 of the echo canceller. Because the actual echo cancellation happens after the receive filter 443, for that reason, in one embodiment, the pilot signal is convolved with the total channel estimate ĥ and with a filter, such as the receive filter, to generate the feedback signal estimate Î[k] for echo cancellation. That is, the total feedback channel estimate h is convolved with the receive filter to generate a "composite channel estimate" given as ĥ*RxFilter. The composite channel estimate is then convolved with the pilot samples y[k] to generate the feedback signal estimate. The feedback signal estimate thus generated is then supplied to summer 444 to be subtracted from the receive signal r[k] to realize echo cancellation.

Accordingly, in some embodiments, such as when the echo cancellation is performed after receive signal filtering, the pilot signal needs to be convolved with both the channel estimate as well as another filter representative of the receive signal filtering, such as the receive filter. This can be done by convolving the pilot signal with a composite channel estimate comprised of the channel estimate as well as the other filter. If the other filter has a delay of D which is greater than M2, the number of non causal taps, and the other filter is circularly convolved with the channel estimate, then after keeping the first M1+L−1 taps where L is the length of the filter, both the non-causal and causal taps are included in the composite channel estimate.

Figure 11:
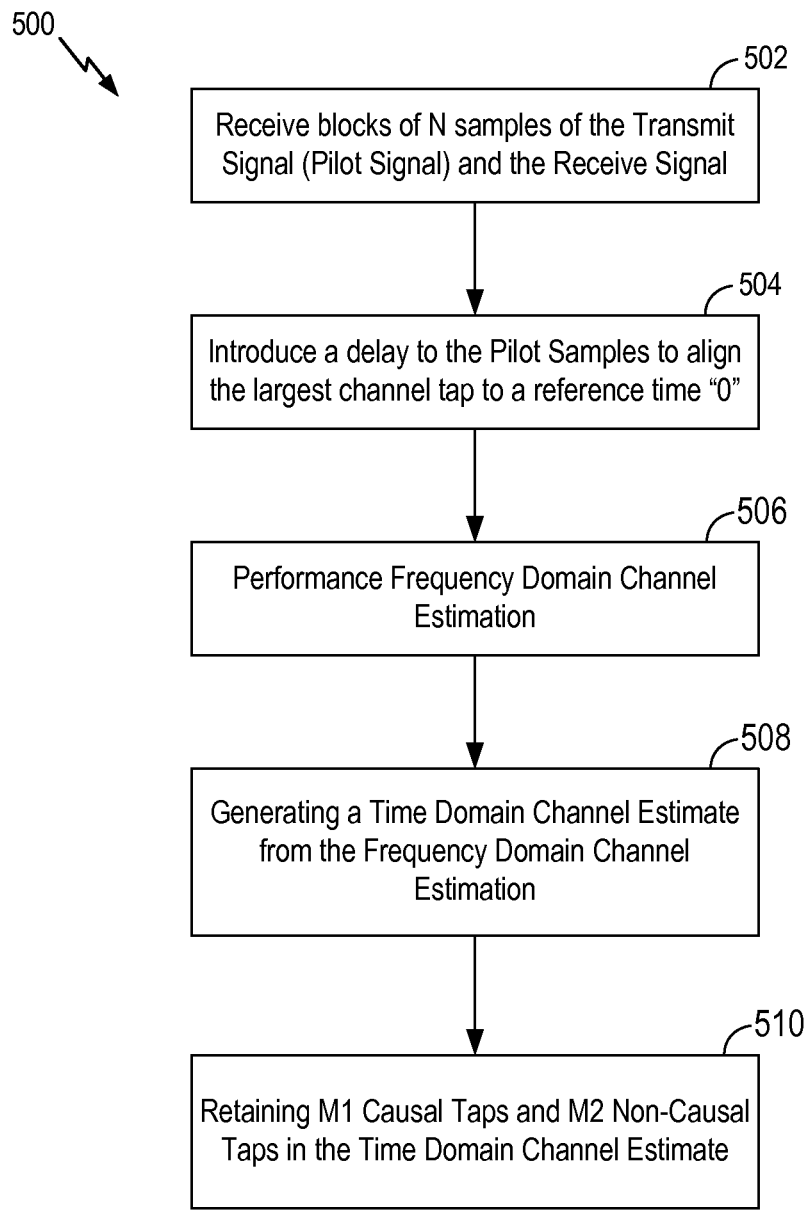
FIG. 11 is a flowchart illustrating the channel estimation method for keeping both the causal and the non-causal taps of the feedback channel estimate according to one embodiment of the present invention.

FIG. 11 is a flowchart illustrating the channel estimation method for keeping both the causal and the non-causal taps of the feedback channel estimate according to one embodiment of the present invention. Referring to FIG. 11, channel estimation method 500 starts by receiving blocks of N samples of the amplified signal as a pilot signal and receiving blocks of N samples of the receive signal (step 502). Then, method 500 introduces a delay to the samples of the pilot signal to align the largest channel tap of the feedback channel to a first reference time (step 504). Method 500 then estimates the feedback channel between the first antenna and the second antenna using frequency domain channel estimation using samples of the pilot signal and samples of the receive signal (step 506). Method 500 generates a time domain feedback channel estimate from the frequency domain channel estimation. In one embodiment, the time domain feedback channel estimate having N taps (step 508). Finally, method 500 retains M1 causal taps and M2 non-causal taps in the time domain feedback channel estimate (step 510). The M1 causal taps are the first M1 taps of the channel estimate and the M2 non-causal taps are the last M2 taps of the channel estimate. In one embodiment, M1+M2 is less than N and only M1+M2 taps of the channel estimate are kept. In other embodiments of the channel estimation method of the present invention, no delay is introduced to the pilot samples and the channel estimation method operates in the same manner to capture both the causal taps and the non-causal taps of the channel estimate. In other words, delay D2 in repeater 400 may be set to zero and step 504 in method 500 is optional.

Channel estimation module 260 in repeater 250 may be used to implement the channel estimate method of the present invention for keeping both the causal and the non-causal taps of the feedback channel estimate. Channel estimation module 260 may be implemented in software, hardware, firmware, or some combination, and may be configured to perform the functions described in the embodiments described herein. In a software implementation, channel estimation module 260 may comprise memory and one or more processors that may be dedicated to the channel estimation module 260 or be shared with other features or modules of the repeater. N-sample blocks indicative of the transmit signal may be stored in memory, as well as N-sample blocks indicative of the receive signal. The processor may access instructions to read the stored data and introduce the necessary delay. The processor may access instructions to perform FFT operations on the data to generate frequency domain pilot signal blocks and frequency domain receive signal blocks. The processor may access instructions to generate a frequency domain channel estimate from the frequency domain pilot and receive signal blocks. The processor may access instructions to perform an inverse fast Fourier transform on the frequency domain channel estimate to generate a time domain channel estimate. In some embodiments, the processor may access instructions to retain causal taps and non-causal taps in the time domain channel estimate. Similarly, in a hardware implementation, the FFT and IFFT operations may be performed using hardware such as a digital signal processor (DSP).

In alternate embodiments of the present invention, the M1 causal taps and the M2 non-causal taps of the time domain channel estimate are scaled using the set of correction scaling factors described above with reference to FIG. 4 for cancelling multiplicative error in the channel estimate. In one embodiment, the correction scaling factors are function of only the tap index and the FFT block size. The resulting scaled channel estimate can then be used for echo cancellation in the repeater.

4. Truncating the Channel Estimate

When frequency domain channel estimation using FFT/IFFT processing is applied in a repeater, the feedback channel estimate is equal to the FFT size N, for example 1024. However, the feedback channel duration is limited. For instance, in repeater applications, the feedback channel is usually on the order of tens of samples, such as 64 samples. Channel estimation algorithm based on pilots introduces noise in the channel estimate. The noise is strong where the pilot is weak, that is, out-of-band. The noise also permeates to all samples of the time-domain channel estimation. In a conventional repeater, the receive filter (RxFilter) is sometimes used to reduce channel estimation noise by suppressing the noise at a stopband.

According to embodiments of the present invention, a channel estimation method in a repeater applies truncation to the time-domain channel estimate to zero out channel taps that do not contain the feedback channel so as to reduce channel estimation noise. More specifically, the method uses a priori information about the channel length to determine in which taps the channel lies. Channel taps that are outside of the channel are zeroed out to reduce noise.

In one embodiment, for a channel estimate of size N and a feedback channel having a channel length L where L is assumed to be much less than N, the channel estimate is truncated by zeroing out the channel taps that are outside of the channel. For instance, in one embodiment, for a channel estimate $\hat{h}$ having a size N, the truncation is applied to keep the first M taps of the channel and to zero out channel taps M+1 to N. The truncated channel estimate is thus given as:

$$\hat{h} = [\hat{h}_0, \hat{h}_1, \hat{h}_2, L\hat{h}_M, 0L0],$$

where M is greater than or equal to the channel length L. In this manner, the channel estimate that lies in the first M taps of the channel are retained while the channel estimate that lies in the M+1 to N taps of the channel estimate are zeroed out to remove noise.

In another embodiment, channel estimate truncation is applied to preserve both the causal and non-causal taps of the channel estimate. In the case where the pilot samples are left shifted to align the largest channel tap at reference time 0, part of the channel becomes non-causal and the non-causal channel needs to be accounted for in the channel estimation process. In the channel estimation method described above, both the causal and the non-causal are used for the purpose of channel estimation. When channel estimate truncation is applied, the causal and non-causal taps of the channel estimate are preserved while the rest of the channel estimate is zeroed out.

In one embodiment, for a channel estimate of size N, a feedback channel having a causal channel of length L and a non-causal channel of length P, where L and P are both assumed to be much less than N, the channel estimate is truncated by zeroing out the channel taps that are outside of the causal and the non-causal channels. For instance, the truncation is applied to keep the first M1 taps and the N−M2 to N taps of the channel while zeroing out channel taps M1+1 to N−M2−1. The truncated channel estimate is thus given as:

$$\hat{h} = [\hat{h}_0, \hat{h}_1, \hat{h}_2, L\hat{h}_{M1}, 0L0, \hat{h}_{N-M2}, \hat{h}_{N-M2+1}, L\hat{h}_{N-1}],$$

where M1 is greater than or equal to the causal channel length L and M2 is greater than or equal to the non-causal channel length P. In this manner, the channel estimate that lies in the M1+1 to N−M2−1 taps of the channel estimate are zeroed out to remove noise.

By truncating the part of the time domain channel estimate, channel estimate noise is reduced to improve the accuracy of the channel estimation.

5. Channel Estimate Pruning

During the operation of a same frequency repeater, it is desirable to maintain stability in the repeater in the presence of large signal dynamics. In order to maintain repeater stability in the presence of large signal dynamics in the remote signal energy, the repeater needs to know when a sudden change in receive power occurs. Sudden changes in the receive power can corrupt the channel estimation so that the feedback channel estimate becomes inaccurate and echo cancellation of the feedback signal becomes incorrect, leading to repeater instability.

According to embodiments of the present invention, a method for improving the stability of a repeater in the presence of large signal dynamics implements channel estimation pruning. In some embodiments, the power of the remote signal is monitored to detect sudden changes in the receive power. The channel estimation pruning method operates to discard channel estimates or pilot and receives samples associated with large change in the signal dynamics of the remote signal. In this manner, the overall channel estimate will not be corrupted due to sudden changes in the receive power.

Figure 12:
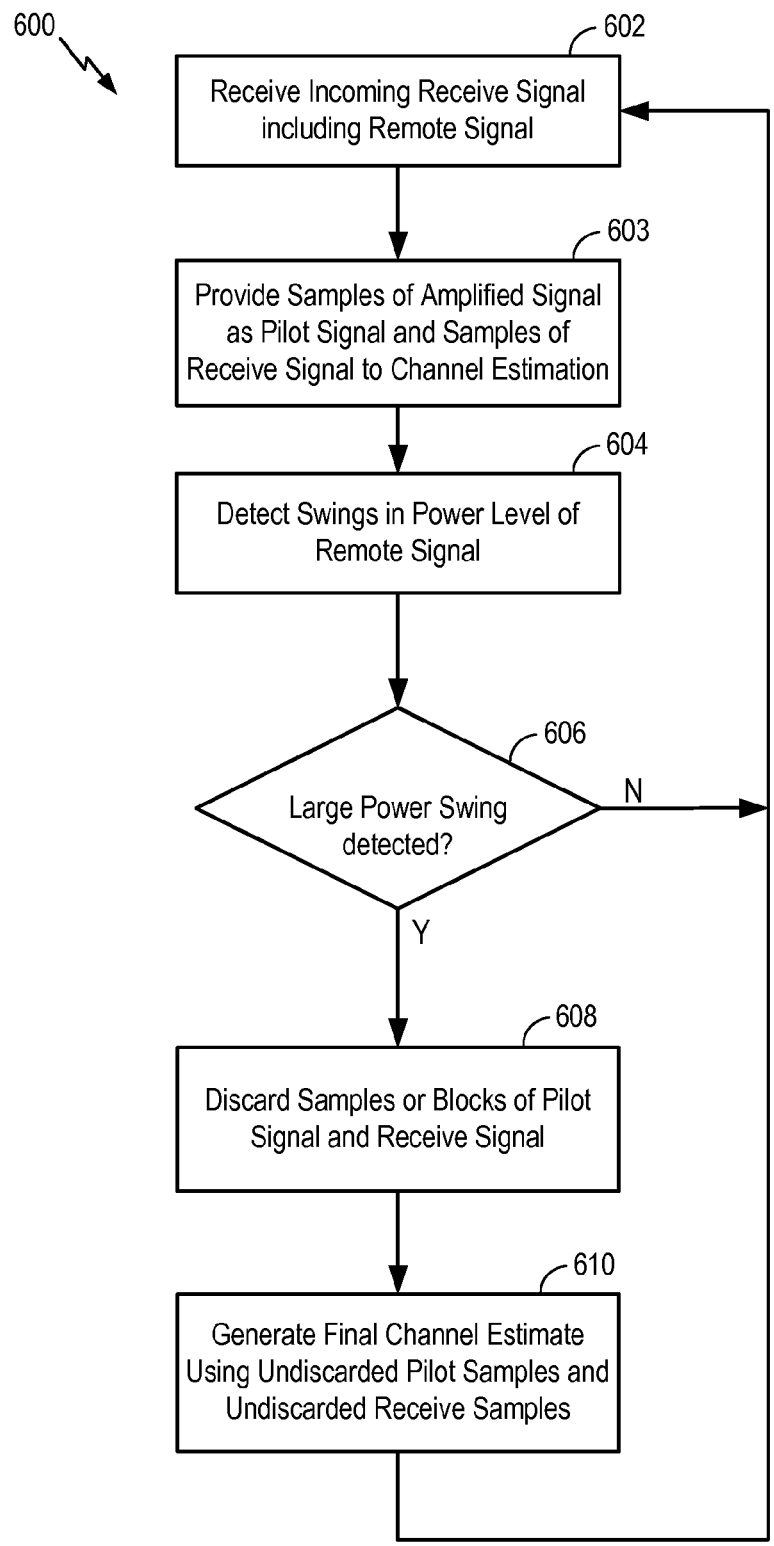
FIG. 12 is a flowchart illustrating the channel estimation pruning method in a wireless repeater according to one embodiment of the present invention.

FIG. 12 is a flowchart illustrating the channel estimation pruning method in a wireless repeater according to one embodiment of the present invention. The channel estimation pruning method of the present invention can be implemented in an echo cancellation repeater, such as the repeater shown in FIG. 3 or FIG. 6. In practice, the channel estimation pruning method is implemented in a channel estimate module in the channel estimation block (260 or 450) of the repeaters in FIG. 3 and FIG. 6. More specifically, the channel estimation block estimates the feedback channel using blocks of incoming pilot samples (x in FIG. 3; or delayed y[k] in FIG. 6) and blocks of incoming receive samples (y in FIG. 3; or delayed r[k] in FIG. 6). In some embodiments, a final channel estimate is computed using the blocks of incoming pilot samples and the blocks of incoming receive samples. The final channel estimate is then used by the echo canceller to cancel out the feedback signal. In some other embodiments, a channel estimate is computed using a block of incoming pilot samples and a block of incoming receive samples and multiple channel estimates thus computed are then averaged to generate the final channel estimate. In the present description, the channel estimate computed for each individual pilot sample block and the corresponding receive sample block is referred to as a "sub channel estimate".

Referring to FIG. 12, a channel estimation pruning method 600 implemented in a channel estimation algorithm operates to discard samples or blocks of N samples of the pilot signal and the receive signal used for the channel estimation after a large jump in remote signal power has been detected, N being the size of the FFT used for frequency domain channel estimation or the size of the feedback channel estimate. Method 600 starts by receiving the incoming receive signal at a repeater which includes the remote signal (step 602). As described above, the receive signal is the sum of the remote signal and the feedback signal. A signal in the feedback loop of the repeater is used as the pilot signal for channel estimation. In the present embodiment, the pilot signal is the echo cancelled transmit signal or the amplified signal of the repeater. The pilot signal and the receive signal, or blocks of pilot signal samples and blocks of receive signal samples, are provided to the channel estimation block for performing channel estimation (step 603).

Then, swings in the power level of the remote signal are detected to determine if there are large power swings in the remote signal (step 604). The swings in the power level of the remote signal can be detected directly from the receive signal or it can be detected indirectly through measurements of other signals having a power level response corresponding to the remote signal. In one embodiment, swings in the remote signal is detected by using an FIR (finite impulse response) or IIR (infinite impulse response) filter. The detection is implemented by monitoring the power differential between samples of the receive signal spaced a given time apart to determine if a sudden change in the power level has occurred.

When no large power swings are detected in the gain control input signal (step 606), method 600 returns to step 602 to continue to receive the incoming receive signal and continue to estimate the feedback channel based on the incoming samples of the pilot signal and the receive signal. However, when a large power swing, such as a power swing of 9 dB or greater, is detected (step 606), samples or blocks of N samples of the pilot signal and the corresponding receive signal are discarded (step 608). A final channel estimate is computed using one or more of the undiscarded blocks of the pilot and receive signals (step 610). Method 600 then returns to step 602 to continue to receive incoming receive signal. In this manner, samples of or blocks of N samples of the pilot signal and receive signal associated with swings in the remote signal power are discarded before the pilot signal samples and receive signal samples corrupt the channel estimates.

In one embodiment, method 600 discards both the current block of N samples and one or more previous blocks of N samples of the pilot and receive signals in response to a large power swing being detected in the remote signal. The reason to discard both the current and the previous samples of the pilot and receive signals is that there is always some delay between the time a change in remote signal power occurs, and the time the repeater can detect that change. Therefore, it is possible that some of the pilot signal samples and the receive signal samples are already corrupted by the power swing. Accordingly, in channel estimation pruning method 600, both the current and the previous pilot and receive signal samples are discarded when a large power swing is detected so that no corrupted samples are retained and used for computed the final channel estimate.

In another embodiment, swings in the remote signal can be detected using the receive signal, or the cancelled signal at any point along the main path through the repeater.

Figure 13:
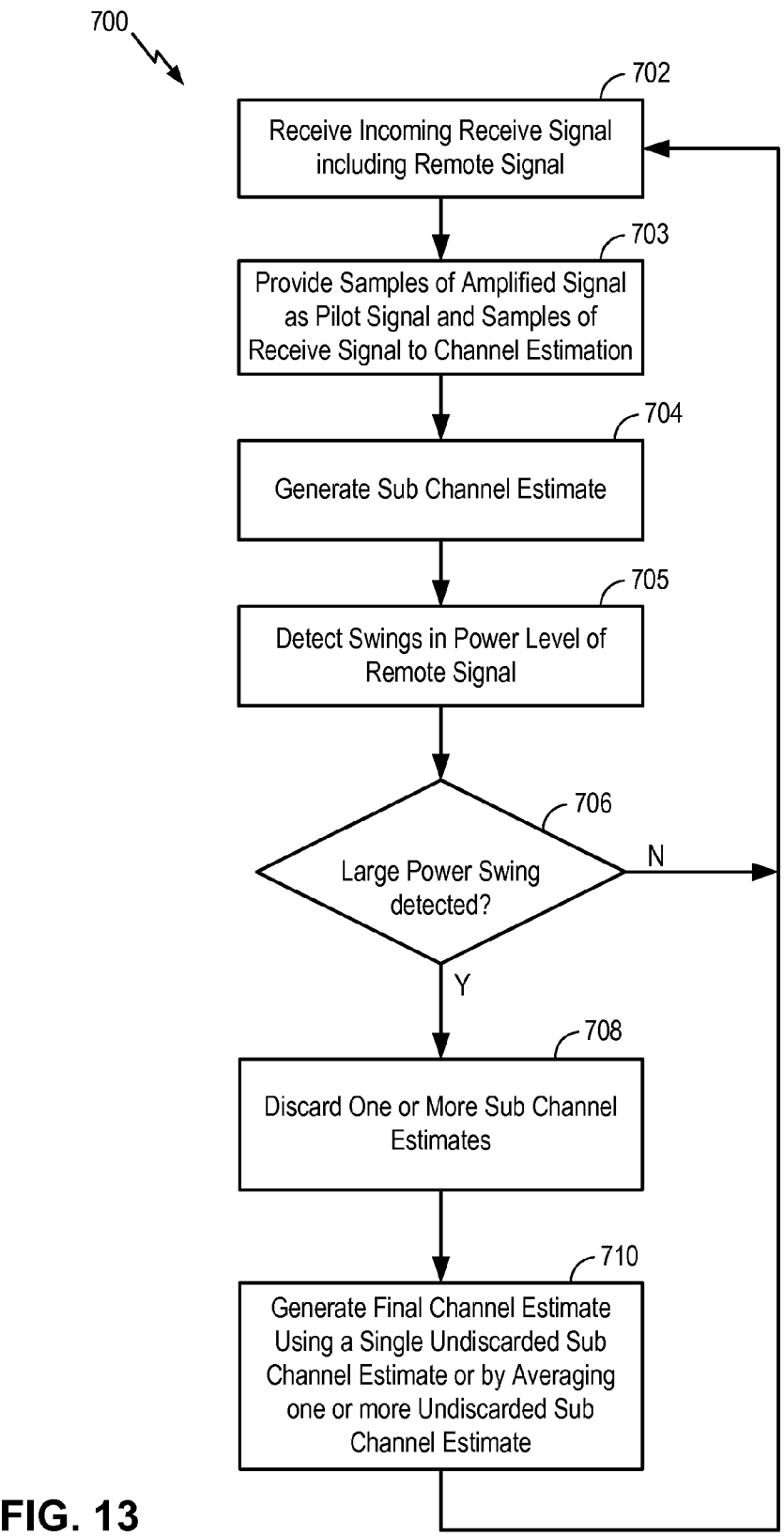
FIG. 13 is a flowchart illustrating the channel estimation pruning method in a wireless repeater according to an alternate embodiment of the present invention.

FIG. 13 is a flowchart illustrating the channel estimation pruning method in a wireless repeater according to an alternate embodiment of the present invention. Referring to FIG. 13, in channel estimation pruning method 700, the channel estimation pruning method operates to discard sub channel estimates after a large jump in the power signal of the remote signal has been detected. Method 700 starts by receiving the incoming receive signal at a repeater which includes the remote signal (step 702). The pilot signal and the receive signal, or blocks of pilot signal samples and blocks of receive signal samples, are provided to the channel estimation block for performing channel estimation (step 703). Sub channel estimate for each incoming block of pilot signal samples is thus computed (step 704). Each sub-channel estimate is computed using a block of N samples of the pilot signal and a block of N samples of the receive signal.

Then, swings in the power level of the remote signal are detected to determine if there are large power swings in the remote signal (step 705). When no large power swings are detected in the gain control input signal (step 706), method 700 returns to step 702 to continue to receive the incoming receive signal and continue to estimate the feedback channel based on the incoming samples of the pilot signal and the receive signal. However, when a large power swing, such as a power swing of 9 dB or greater, is detected (step 706), one or more sub channel estimates are discarded (step 708). A final channel estimate is computed using a single undiscarded sub channel estimate or by averaging two or more undiscarded sub channel estimates (step 710). Method 700 then returns to step 702 to continue to receive incoming receive signal.

In one embodiment, both the current and one or more previous sub channel estimates are discarded when a large power swing is detected. When the channel estimate averaging process is restarted after a large power swing is detected, the final channel estimate used should be the last good final channel estimate, that is, the latest final channel estimate that does not use the sub channel estimates being discarded. The reason to discard both the current and the previous channel estimates is that there is always some delay between the time a change in remote signal power occurs, and the time the repeater can detect that change. Therefore, it is possible that a bad sub channel estimate has already occurred by the time the channel estimation pruning method 700 detects the sudden change in receive power. Repeater instability can occur if only the current sub channel estimate is discarded. Accordingly, in some embodiments of the channel estimation pruning method 700, both the current and the one or more previous sub channel estimates are discarded when a large power swing is detected and the last good final channel estimate is used to continue averaging of the channel estimates. In other embodiments, method 700 discards all of the sub channel estimates that may be corrupted by the power swing so that no corrupted sub channel estimate is retained.

Channel estimation module 260 in repeater 250 may be used to implement the channel estimation pruning method of the present invention. Channel estimation module 260 may be implemented in software, hardware, firmware, or some combination, and may be configured to perform the functions described in the embodiments described herein. In a software implementation, channel estimation module 260 may comprise memory and one or more processors that may be dedicated to the channel estimation module 260 or be shared with other features or modules of the repeater. N-sample blocks indicative of the transmit signal may be stored in memory, as well as N-sample blocks indicative of the receive signal. The processor may access instructions to read the stored data and perform channel estimation on the pilot signal blocks and receive signal blocks. The processor may access instructions to detect changes in the power level of the remote signal. In some embodiments, the processor may access instructions to discard samples or blocks of samples of the pilot and receive signals, while in some embodiments, one or more sub channel estimates may be discarded. Similarly, in a hardware implementation, the various operations may be performed using hardware such as a digital signal processor (DSP).

The advantage of applying power detection in an interference cancellation repeater is that stability is maintained regardless of the signal dynamics of the remote signal. If there were no power detection to deal with such signal dynamics, the repeater could potentially become unstable. The channel estimation pruning method of the present invention ensures that an on-frequency repeater can run robustly in the presence of large scale signal dynamics of the remote signal. More specifically, the channel estimation pruning method of the present invention ensures that channel estimates do not become corrupted due to undesired signal dynamics so that channel estimation and echo cancellation can run robustly in the presence of changing signal dynamics of the remote signal.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on a computer-readable medium. Computer-readable media includes computer storage media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method for estimating a feedback channel for a wireless repeater in a wireless communication system, the wireless repeater having a first antenna and a second antenna to receive a receive signal and transmit an amplified signal, the receive signal being a sum of a remote signal to be repeated and a feedback signal resulting from the feedback channel between the first and second antenna of the wireless repeater, the method comprising:
   (a) selecting blocks of N samples of the amplified signal in a feedback loop of the repeater as a pilot signal;
   (b) selecting blocks of N samples of the receive signal;
   (c) estimating an error correction term using a most recent channel estimate;
   (d) canceling the error correction term from a current block of the receive signal to generate a corrected block of the receive signal; and
   (e) estimating the feedback channel between the first antenna and the second antenna using frequency domain channel estimation and using a current block of the pilot signal and the corrected block of the receive signal, the channel estimate obtained becoming the most recent channel estimate.

2. The method of claim 1, wherein estimating an error correction term using a most recent channel estimate comprises estimating the error correction term using the most recent channel estimate and a current block of N samples pilot signal.

3. The method of claim 1, wherein estimating the feedback channel between the first antenna and the second antenna using frequency domain channel estimation comprises performing Fast Fourier transform (FFT) operations on the current blocks of the pilot signal and the corrected block of the receive signal.

4. The method of claim 1, further comprising:
   (f) replacing the channel estimate obtained from estimating the feedback channel using the corrected block of the receive signal as the most recent channel estimate; and
   (g) repeating the steps of (a) through (f) on the next block of N samples of the pilot signal and the next block of N samples of the receive signal.

5. The method of claim 1, further comprising:
   (f) replacing the channel estimate obtained from estimating the feedback channel using the corrected block of the receive signal as the most recent channel estimate; and
   (g) repeating the steps of (a) through (f) for a fixed number of iterations on the current block of N samples of the pilot signal and the current block of N samples of the receive signal.

6. The method of claim 5, further comprising:
   (h) repeating the steps of (a) through (g) on the next block of N samples of the pilot signal and the next block of N samples of the receive signal.

7. The method of claim 1, wherein canceling the error correction term from a current block of the receive signal comprises:
   canceling the error correction term from a current block of the receive signal in the time domain or in the frequency domain.

8. The method of claim 1, wherein estimating the feedback channel between the first antenna and the second antenna using frequency domain channel estimation comprises:
   estimating the feedback channel between the first antenna and the second antenna using frequency domain channel estimation and using a current block of the pilot signal, the corrected block of the receive signal and one or more previously corrected blocks of the receive signal and the corresponding blocks of the pilot signal, the channel estimate obtained becoming the most recent channel estimate.

9. The method of claim 1, wherein estimating an error correction term using a most recent channel estimate and canceling the error correction term from a current block of the receive signal comprise:
   estimating a channel estimate error term directly based on the most recent channel estimate; and
   canceling the channel estimate error term from the most recent channel estimate.

10. A non-transitory machine-readable medium comprising instructions, which, when executed by a machine, cause the machine to perform operations, the instructions comprising:
   (a) selecting blocks of N samples of the amplified signal in a feedback loop of the repeater as a pilot signal;
   (b) selecting blocks of N samples of the receive signal;
   (c) estimating an error correction term using a most recent channel estimate;
   (d) canceling the error correction term from a current block of the receive signal to generate a corrected block of the receive signal; and
   (e) estimating the feedback channel between the first antenna and the second antenna using frequency domain channel estimation and using a current block of the pilot signal and the corrected block of the receive signal, the channel estimate obtained becoming the most recent channel estimate.

11. A non-transitory computer-readable medium including program code stored thereon, comprising:
- program code to select blocks of N samples of the amplified signal in a feedback loop of the repeater as a pilot signal;
- program code to select blocks of N samples of the receive signal;
- program code to estimate an error correction term using a most recent channel estimate;
- program code to cancel the error correction term from a current block of the receive signal to generate a corrected block of the receive signal; and
- program code to estimate the feedback channel between the first antenna and the second antenna using frequency domain channel estimation and using a current block of the pilot signal and the corrected block of the receive signal, the channel estimate obtained becoming the most recent channel estimate.

12. A wireless repeater, comprising:
- a first antenna and a second antenna to receive a receive signal and transmit an amplified signal, the receive signal being a sum of a remote signal to be repeated and a feedback signal resulting from a feedback channel between the first antenna and the second antenna; and
- a channel estimation module configured to estimate an error correction term using a most recent channel estimate and a current block of N samples of a signal in a feedback loop of the repeater indicative of the amplified signal as a pilot signal, to cancel the error correction term from a current block of N samples of the receive signal to generate a corrected block of the receive signal, and to estimate the feedback channel between the first antenna and the second antenna using frequency domain channel estimation and using the current block of the pilot signal and the corrected block of the receive signal, the channel estimate obtained becoming the most recent channel estimate.

13. The wireless repeater of claim 12, wherein the channel estimation module is configured to estimate the feedback channel between the first antenna and the second antenna using frequency domain channel estimation by performing Fast Fourier transform (FFT) operations on the current blocks of the pilot signal and the corrected block of the receive signal.

14. The wireless repeater of claim 12, wherein the channel estimation module is further configured to replace the channel estimate obtained from the feedback channel estimation using the corrected block of the receive signal as the most recent channel estimate, and to repeat estimating the error correction term, canceling the error correction term and estimating the feedback channel on the next block of N samples of the pilot signal and next block of N samples of the receive signal.

15. The wireless repeater of claim 12, wherein the channel estimation module is further configured to replace the channel estimate obtained from the feedback channel estimation using the corrected block of the receive signal as the most recent channel estimate, and to repeat for a fixed number of iterations estimating the error correction term, canceling the error correction term and estimating the feedback channel on the current block of N samples of the pilot signal and the current block of N samples of the receive signal.

16. The wireless repeater of claim 15, wherein the channel estimation module is further configured to repeat estimating the error correction term, canceling the error correction term and estimating the feedback channel on the next block of N samples of the pilot signal and next block of N samples of the receive signal.

17. The wireless repeater of claim 12, wherein the channel estimation module is configured to cancel the error correction term from a current block of N samples of the receive signal in the time domain or in the frequency domain.

18. The wireless repeater of claim 12, wherein the channel estimation module is further configured to estimate the feedback channel between the first antenna and the second antenna using frequency domain channel estimation and using a current block of the pilot signal, the corrected block of the receive signal and one or more previously corrected blocks of the receive signal and the corresponding blocks of the pilot signal, the channel estimate obtained becoming the most recent channel estimate.

19. The wireless repeater of claim 12, wherein the channel estimation module is configured to estimate a channel estimate error term directly based on the most recent channel estimate and is further configured to the channel estimate error term from the most recent channel estimate instead of cancelling the error correction term from a current block of N samples of the receive signal.

20. A wireless repeater, comprising:
- first and second means for receiving a receive signal and transmit an amplified signal, the receive signal being a sum of a remote signal to be repeated and a feedback signal resulting from a feedback channel between the first and second means; and
- third means for estimating an error correction term using a most recent channel estimate and a current block of N samples of a signal in a feedback loop of the repeater indicative of the amplified signal as a pilot signal, canceling the error correction term from a current block of N samples of the receive signal to generate a corrected block of the receive signal, and estimating the feedback channel between the first antenna and the second antenna using frequency domain channel estimation and using the current block of the pilot signal and the corrected block of the receive signal, the channel estimate obtained becoming the most recent channel estimate.

21. A method for estimating a feedback channel for a wireless repeater in a wireless communication system, the wireless repeater having a first antenna and a second antenna to receive a receive signal and transmit an amplified signal, the receive signal being a sum of a remote signal to be repeated and a feedback signal resulting from the feedback channel between the first and second antenna of the wireless repeater, the method comprising:
- (a) selecting blocks of N samples of the amplified signal in a feedback loop of the repeater as a pilot signal;
- (b) selecting blocks of N samples of the receive signal;
- (c) estimating a channel estimate error term using a most recent channel estimate;
- (d) estimating the feedback channel between the first antenna and the second antenna using frequency domain channel estimation and using a current block of the pilot signal and the corresponding block of the receive signal;
- (e) processing the channel estimate error term through the frequency domain channel estimation; and
- (f) canceling the channel estimate error term from the computed channel estimate, the channel estimate obtained becoming the most recent channel estimate.

22. The method of claim 3, wherein N is a block size of the FFT operations being performed on the current blocks of the pilot signal and the corrected block of the receive signal.

23. The method of claim 1, wherein using frequency domain channel estimation comprises using frequency domain channel estimation without a cyclic prefix in the amplified signal.

* * * * *